(12) United States Patent  (10) Patent No.: US 8,567,817 B2
Yamamoto  (45) Date of Patent: Oct. 29, 2013

(54) SIDE AIRBAG DEVICE FOR VEHICLE

(75) Inventor: Kazuhito Yamamoto, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 13/201,397

(22) PCT Filed: May 11, 2009

(86) PCT No.: PCT/JP2009/058779
§ 371 (c)(1),
(2), (4) Date: Aug. 12, 2011

(87) PCT Pub. No.: WO2010/131326
PCT Pub. Date: Nov. 18, 2010

(65) Prior Publication Data
US 2012/0043741 A1 Feb. 23, 2012

(51) Int. Cl.
B60R 21/207 (2006.01)
B60R 21/233 (2006.01)

(52) U.S. Cl.
USPC ............ 280/729; 280/730.2; 280/743.1

(58) Field of Classification Search
CPC ............ B60R 21/232; B60R 21/233; B60R 21/23138; B60R 2021/23324; B60R 2021/23138; B60R 2021/23146; B60R 21/207
USPC .......... 280/728.2, 729, 730.2, 740, 743.1
See application file for complete search history.

(56) References Cited

U.S. PATENT DOCUMENTS

| 5,141,247 A | * | 8/1992 | Barth ................ 280/728.2 |
| 5,423,568 A | * | 6/1995 | Zushi et al. ........ 280/728.2 |
| 5,427,406 A | * | 6/1995 | Zushi et al. ........ 280/728.2 |
| 5,687,988 A | * | 11/1997 | Storey et al. ....... 280/728.2 |
| 5,803,486 A | * | 9/1998 | Spencer et al. ..... 280/728.2 |
| 5,906,391 A |   | 5/1999 | Weir et al. |

(Continued)

FOREIGN PATENT DOCUMENTS

| CN | 1511738 A | 7/2004 |
| CN | 1655968 A | 8/2005 |

(Continued)

OTHER PUBLICATIONS

U.S. Appl. No. 13/502,665 in the name of Yamamoto, filed Apr. 18, 2012.

(Continued)

Primary Examiner — Joseph Rocca
(74) Attorney, Agent, or Firm — Oliff & Berridge, PLC

(57) ABSTRACT

A side airbag has a high-pressure chamber and a low-pressure chamber with a pressure lower than the pressure in the high-pressure chamber. An inflator is provided in the low-pressure chamber with a gas discharge section facing the high-pressure chamber. In a side collision, gas from the inflator is supplied mainly toward the high-pressure chamber and is supplied also to the low-pressure chamber. The high-pressure chamber and the low-pressure chamber are partitioned by a partition wall. A check valve mounted to the partition wall is opened by the pressure gas supplied from the inflator, which is provided in the low-pressure chamber, toward the high-pressure chamber, and thus the cheek valve permits the gas to flow from the low-pressure chamber to the high-pressure chamber. When the inflator completes the discharge of the gas, the check valve restricts such flow of the gas from the high-pressure chamber to the low-pressure chamber.

7 Claims, 21 Drawing Sheets

(56) References Cited

U.S. PATENT DOCUMENTS

| | | | |
|---|---|---|---|
| 6,062,594 A | 5/2000 | Asano et al. | |
| 6,402,190 B1 | 6/2002 | Heudorfer et al. | |
| 7,021,652 B2* | 4/2006 | Kumagai et al. | 280/729 |
| 7,063,350 B2* | 6/2006 | Steimke et al. | 280/729 |
| 7,347,444 B2* | 3/2008 | Wheelwright | 280/729 |
| 7,364,194 B2* | 4/2008 | Mabuchi et al. | 280/741 |
| 7,384,062 B2* | 6/2008 | Yokoyama et al. | 280/730.2 |
| 7,503,582 B2* | 3/2009 | Sendelbach et al. | 280/743.1 |
| 7,581,752 B2* | 9/2009 | Kai et al. | 280/730.2 |
| 7,637,530 B2* | 12/2009 | Yamaji et al. | 280/730.2 |
| 7,661,699 B2* | 2/2010 | Buhrlen et al. | 280/729 |
| 7,819,424 B2* | 10/2010 | Toda et al. | 280/730.2 |
| 7,900,957 B2* | 3/2011 | Honda | 280/729 |
| 7,926,838 B2* | 4/2011 | Honda et al. | 280/729 |
| 7,938,436 B2* | 5/2011 | Lunt et al. | 280/728.2 |
| 7,963,556 B2* | 6/2011 | Loos et al. | 280/740 |
| 2003/0168836 A1 | 9/2003 | Sato et al. | |
| 2004/0130127 A1 | 7/2004 | Kurimoto et al. | |
| 2005/0104342 A1 | 5/2005 | Jackson et al. | |
| 2005/0161927 A1 | 7/2005 | Yokoyama et al. | |
| 2005/0189742 A1 | 9/2005 | Kumagai et al. | |
| 2006/0001244 A1 | 1/2006 | Taguchi et al. | |
| 2006/0071458 A1 | 4/2006 | Sendelbach et al. | |
| 2007/0164546 A1 | 7/2007 | Kai et al. | |
| 2007/0170707 A1 | 7/2007 | Sato et al. | |
| 2007/0284859 A1 | 12/2007 | Kashiwagi | |
| 2008/0174093 A1* | 7/2008 | Inoue | 280/730.2 |
| 2009/0020987 A1 | 1/2009 | Wipasuramonton et al. | |
| 2009/0026743 A1* | 1/2009 | Arez | 280/740 |
| 2009/0322062 A1 | 12/2009 | Bauer et al. | |
| 2010/0181749 A1 | 7/2010 | Sugimoto | |

FOREIGN PATENT DOCUMENTS

| | | |
|---|---|---|
| DE | 195 17 764 A1 | 11/1996 |
| JP | A-10-100827 | 4/1998 |
| JP | A-11-70849 | 3/1999 |
| JP | A-11-157407 | 6/1999 |
| JP | A-2000-177527 | 6/2000 |
| JP | A-2001-063502 | 3/2001 |
| JP | A-2003-501303 | 1/2003 |
| JP | A-2003-335208 | 11/2003 |
| JP | A-2003-335209 | 11/2003 |
| JP | A-2004-122881 | 4/2004 |
| JP | A-2004-210047 | 7/2004 |
| JP | A-2004-256017 | 9/2004 |
| JP | A-2004-262261 | 9/2004 |
| JP | A-2004-268682 | 9/2004 |
| JP | A-2004-338698 | 12/2004 |
| JP | A-2005-186891 | 7/2005 |
| JP | A-2005-225351 | 8/2005 |
| JP | A-2005-531451 | 10/2005 |
| JP | A-2006-8015 | 1/2006 |
| JP | A-2006-8016 | 1/2006 |
| JP | A-2006-262261 | 9/2006 |
| JP | A-2007-186133 | 7/2007 |
| JP | A-2007-308122 | 11/2007 |
| JP | A-2008-18925 | 1/2008 |
| JP | A-2008-247373 | 10/2008 |
| JP | A-2009-23640 | 2/2009 |
| JP | A-2010-163142 | 7/2010 |
| WO | WO 2007/110167 A1 | 10/2007 |
| WO | WO 2010/131326 A1 | 11/2010 |
| WO | WO 2011/077510 A1 | 6/2011 |

OTHER PUBLICATIONS

U.S. Appl. No. 13/318,432 in the name of Yamamoto, filed Nov. 1, 2011.

International Search Report issued in International Application No. PCT/JP2009/058779 on Aug. 18, 2009 (with translation).

Feb. 16, 2010 International Search Report issued in International Application No. PCT/JP2009/071254 (with translation).

Apr. 27, 2010 International Search Report issued in International Application No. PCT/JP2010/054578 (with translation).

Jan. 18, 2013 Office Action issued in U.S. Appl. No. 13/318,432.

Jun. 3, 2013 Office Action issued in U.S. Appl. No. 13/318,432.

* cited by examiner

SIDE AIRBAG DEVICE FOR VEHICLE

TECHNICAL FIELD

The present invention relates to a side airbag device for a vehicle.

BACKGROUND ART

A structure has been disclosed (see Patent Reference 1) in which the interior of an airbag for side impacts is partitioned into an upper chamber and a lower chamber by a seam, a communication portion that communicates between the upper chamber and the lower chamber is formed between the seam and a rear edge of the airbag, a tubular check valve is provided at the communication portion, a gas generator is disposed in the check valve, and an outflow of gas from the lower chamber to the upper chamber is impeded by the check valve. Thus, even if the body of a vehicle occupant strikes the lower chamber, gas pressure in the lower chamber is maintained at a high pressure.

Patent Reference 1: Japanese Patent Application Laid-Open (JP-A) No. 2004-256017

DISCLOSURE OF INVENTION

Problem to be Solved by the Invention

However, the related art example mentioned above has a structure in which the check valve is inflated in a substantially tubular shape and a high-pressure portion is formed by gas being discharged radially from an end portion of the gas generator, and the gas is supplied to each of the upper chamber and the lower chamber using pressure differences between the high-pressure portion and the upper chamber and lower chamber. Therefore, it is necessary for the check valve to have the tubular shape. Moreover, in order to restrict the passage of gas around the check valve between the upper chamber and the lower chamber, side edges at the airbag front side of the check valve must be sewn to the seam or the like partitioning the upper chamber and lower chamber, and it is difficult to guarantee a bag thickness of the airbag in the region dividing the upper and lower chambers.

In consideration of the above circumstances, an object of the present invention is, with a simple structure, to promptly inflate and expand a high-pressure chamber of a side airbag and to allow the pressure in the high-pressure chamber to be maintained for a long-time.

Means for Solving the Problem

A first aspect of the present invention includes: a side airbag that includes a high-pressure chamber, which has a high pressure at a time of inflation and expansion, and a low-pressure chamber, which has a lower pressure than the high-pressure chamber, the high-pressure chamber and the low-pressure chamber each inflating and expanding at a time of side collision; a partition wall that is disposed in the side airbag and partitions the high-pressure chamber from the low-pressure chamber; an inflator that is disposed in the low-pressure chamber in a state in which a gas discharge section faces the high-pressure chamber, that supplies gas for inflation mainly toward the high-pressure chamber and that also supplies the gas for inflation to the low-pressure chamber; and a check valve that is disposed at the partition wall, that permits the gas discharged from the gas discharge section of the inflator to flow from the low-pressure chamber to the high-pressure chamber, and that restricts a flow of the gas in the opposite direction.

In the side airbag device for a vehicle relating to the first aspect, the side airbag includes the high-pressure chamber that has a high pressure during inflation and expansion and the low-pressure chamber that has a lower pressure than the high-pressure chamber, and the inflator is disposed in the low-pressure chamber with the gas discharge section facing the high-pressure chamber. When there is a side collision, the inflator operates and the gas for inflation that is discharged from the gas discharge section of the inflator is supplied mainly to the high-pressure chamber, and is also supplied to the low-pressure chamber of the side airbag.

The high-pressure chamber and low-pressure chamber are partitioned by the partition wall. The check valve provided at the partition wall is opened by the pressure of the gas supplied from the inflator in the low-pressure chamber toward the high-pressure chamber, and allows the gas to flow from the low-pressure chamber into the high-pressure chamber. Thus, the gas is supplied with precedence to the high-pressure chamber, and the high-pressure chamber promptly inflates and expands and has a higher pressure than the low-pressure chamber. When the inflator completes the discharge of the gas, the gas tries to flow back from the high-pressure chamber to the low-pressure chamber, but the check valve restricts such flow of the gas. Hence, the inner pressure of the high-pressure chamber may be maintained for a long time.

A second aspect of the present invention is the side airbag device for a vehicle relating to the first aspect, in which, in the side airbag in an inflated and expanded state, the inflator is disposed in the side airbag at a vehicle front to rear direction rear side with respect to a vehicle seat, the partition wall is disposed at a position that corresponds with an abdomen area of an occupant sitting on the vehicle seat, the high-pressure chamber is a lower chamber that corresponds with a waist area of the occupant, and the low-pressure chamber is an upper chamber that corresponds with at least one of a chest area or a shoulder area of the occupant.

In the side airbag device for a vehicle relating to the second aspect, the high-pressure chamber is the lower chamber corresponding with the waist area of an occupant, and the low-pressure chamber is the upper chamber corresponding with one or both of the chest area and shoulder area of the occupant. Thus, because the lower chamber inflates and expands prior to the upper chamber and the lower chamber has a higher pressure than the upper chamber when the side airbag inflates and expands, the waist area of the occupant sitting on the vehicle seat may be restrained by the lower chamber promptly and at a high pressure, and one or both of the chest area and shoulder area of the occupant may be restrained by the upper chamber. Moreover, the inner pressure of the lower chamber may be maintained for a long time because of the check valve, and thus occupant restraint performance in a side collision may be further improved.

A third aspect of the present invention is the side airbag device for a vehicle relating to the second aspect, in which the partition wall is formed by sewing together, of an upper fabric that constitutes the upper chamber, a lower edge of an outer side fabric that is disposed at a seat width direction outer side with respect to the vehicle seat and a lower edge of an inner side fabric that is disposed at the seat width direction inner side, and the check valve is disposed at the vehicle front to rear direction rear side in the side airbag, and is formed by extending the upper fabric to a seat downward side.

In the side airbag device for a vehicle relating to the third aspect, the partition wall is formed by sewing, of the upper fabric that structures the upper chamber, a lower edge of the outer side fabric disposed at the seat width direction outer side of the vehicle seat to a lower edge of the inner side fabric disposed at the seat width direction inner side. The check valve is disposed at the vehicle front to rear direction rear side of the side airbag interior, and is formed by the upper fabric being extended to the seat downward side. Thus, there is no need to add the partition wall and/or the check valve separately from the fabrics structuring the side airbag. Therefore, sewing in order to improve airtightness may be omitted, fabrication of the side airbag is simple, and a large reduction in costs may be promoted.

A fourth aspect of the present invention is the side airbag device for a vehicle relating to the third aspect, in which a reinforcement cloth is superposed with and sewn to the check valve.

In the side airbag device for a vehicle relating to the fourth aspect, the reinforcement cloth is superposed with and sewn to the check valve. Thus, strength with respect to the high-temperature, high-pressure gas that is supplied toward the check valve from the gas discharge section of the inflator may be improved.

A fifth aspect of the present invention is the side airbag device for a vehicle relating to any one of the second to fourth aspects, in which a lower end portion of the check valve is at least partially sewn to a lower fabric that constitutes the lower chamber.

In the side airbag device for a vehicle relating to the fifth aspect, the lower end portion of the check valve is at least partially sewn to the lower fabric that structures the lower chamber. Thus, when the discharge of gas from the inflator is completed and the gas tries to flow back from the lower chamber that is the high-pressure chamber to the upper chamber that is the low-pressure chamber and the check valve closes, an inversion of the check valve into the upper chamber may be inhibited. Therefore, the inner pressure of the high-pressure chamber may be stably maintained.

A sixth aspect of the present invention is the side airbag device for a vehicle relating to the second aspect, in which, in the side airbag in the inflated and expanded state, the check valve is constituted by a rear end portion of the partition wall and a rear side inner face of the side airbag, and is structured such that a gas flow path is opened by the rear end portion of the partition wall moving away from the rear side inner face and the gas flow path is closed by the rear end portion abutting against the rear side inner face.

In the side airbag device for a vehicle relating to the sixth aspect, the check valve is constituted by the rear end portion of the partition wall and the rear side inner face of the side airbag. Therefore, the check valve is opened by the rear end portion of the partition wall moving away from the rear side inner face of the side airbag due to the pressure of gas supplied from the inflator in the upper chamber that is the low-pressure chamber toward the lower chamber that is the high-pressure chamber, and permits the gas to flow from the upper chamber to the lower chamber. Thus, the gas is supplied with precedence to the lower chamber, and the lower chamber promptly inflates and expands and has a higher pressure than the upper chamber.

When the discharge of gas from the inflator is completed, the gas tries to flow back from the lower chamber that is the high-pressure chamber to the upper chamber that is the low-pressure chamber. However, at this time the check valve is closed by the rear end portion of the partition wall abutting against the rear side inner face of the side airbag due to the pressure of the gas, and the flow path of the gas is closed off. Therefore, the flow of the gas back from the lower chamber that is the high-pressure chamber to the upper chamber that is the low-pressure chamber is restricted, and the inner pressure of the lower chamber may be maintained for a long time. Therefore, occupant restraint performance in a side impact may be further improved.

A seventh aspect of the present invention is the side airbag device for a vehicle relating to the sixth aspect, in which, in a region of the check valve, angles formed between edge portions at both seat width direction ends of the partition wall and the rear side inner face of the side airbag are set to less than 90°.

In the side airbag device for a vehicle relating to the seventh aspect, the angle formed by the edge portion at each of the two seat width direction sides of the partition wall and the rear side inner face of the side airbag is set to less than 90°. Therefore, when the check valve is closing, the rear end portion of the check valve makes surface contact with the rear side inner face of the side airbag more easily. Therefore, inner pressure of the lower chamber that is the high-pressure chamber may be more stably maintained.

An eighth aspect of the present invention is the side airbag device for a vehicle relating to any one of the second to seventh aspects, in which a diffuser is disposed at the gas discharge section of the inflator, in which diffuser a first aperture portion that opens toward the lower chamber and a second aperture portion that opens toward the upper chamber are provided, the diffuser regulating flows of the gas such that the gas discharged from the gas discharge section mainly flows toward the lower chamber and is also distributed to the upper chamber.

In the side airbag device for a vehicle relating to the eighth aspect, the diffuser is disposed at the gas discharge section of the inflator, and the first aperture portion opening toward the lower chamber and the second aperture portion opening toward the upper chamber are provided at the diffuser. The diffuser may restrict a flow of gas such that the gas discharged through the gas discharge section mainly flows through the first aperture portion into the lower chamber, and is distributed through the second aperture portion to the upper chamber. With a simple structure in which this diffuser is added, both the lower chamber and the upper chamber may be stably inflated and expanded.

A ninth aspect of the present invention is the side airbag device for a vehicle relating to the eighth aspect, in which, in the upper chamber, a first bag thickness regulation portion is provided extending to the seat forward side and diagonally upward from the diffuser side, at which first bag thickness regulation portion, of an upper fabric that constitutes the upper chamber, an outer side fabric that is disposed at the seat width direction outer side with respect to the vehicle seat is sewn to an inner side fabric disposed at the seat width direction inner side, the first bag thickness regulation portion partitioning the upper chamber into a middle chamber at the seat lower side thereof and an uppermost chamber at the seat upper side thereof, the diffuser is set such that the gas discharged from the second aperture portion of the diffuser is supplied to the uppermost chamber and supplied through a predetermined constriction gap to the middle chamber, the predetermined constriction gap being provided between a seat forward side distal end portion of the first bag thickness regulation portion and a seat forward side periphery edge portion of the upper chamber, and an inner pressure of the middle chamber at the time of inflation and expansion of the side airbag is set to a lower pressure than an inner pressure of the uppermost chamber.

In the side airbag device for a vehicle relating to the ninth aspect, the bag thickness of the upper chamber when the side airbag is inflating and expanding is regulated by the first bag thickness regulation portion. Therefore, the upper chamber of the side airbag may be inflated and expanded promptly and smoothly in the limited space between the upper body of the occupant and a side portion of the vehicle. Furthermore, the upper chamber is partitioned into the uppermost chamber and the middle chamber by the first bag thickness regulation portion. The gas discharged through the second aperture portion of the diffuser is supplied to the uppermost chamber, passes through the predetermined constriction gap that is formed between the seat forward distal end portion of the first bag thickness regulation portion and the seat forward periphery edge portion of the upper chamber, and is supplied into the middle chamber. Therefore, a timing of inflation and expansion of the middle chamber is delayed relative to the uppermost chamber, and the middle chamber is set to a lower pressure than the uppermost chamber. Therefore, respective portions of the upper body of the occupant may be restrained with respectively appropriate restraining forces by the side airbag.

A tenth aspect of the present invention is the side airbag device for a vehicle relating to the ninth aspect, in which a second bag thickness regulation portion is provided in the upper chamber, extending to the seat forward side and diagonally upward from the diffuser side, at the seat upper side of the first bag thickness regulation portion with a predetermined spacing from the first bag thickness regulation portion, at which second bag thickness regulation portion the outer side fabric is sewn to the inner side fabric.

In the side airbag device for a vehicle relating to the tenth aspect, the bag thickness of the uppermost chamber during inflation and expansion of the side airbag is regulated by the second bag thickness regulation portion. Therefore, the uppermost chamber of the side airbag may be promptly and smoothly inflated and expanded in the limited space between the upper body of the occupant and the vehicle side.

An eleventh aspect of the present invention is the side airbag device for a vehicle relating to the ninth aspect or the tenth aspect, in which a vent hole is formed in a portion of the upper fabric that constitutes the middle chamber.

In the side airbag device for a vehicle relating to the eleventh aspect, the vent hole is formed in the portion of the upper fabric that constitutes the middle chamber. Thus, when a portion of the upper body of the occupant is restrained by the middle chamber, gas is discharged through the vent hole, and the inner pressure of the middle chamber, which is set to a lower pressure than the uppermost chamber, decreases further. Therefore, restraining force of the middle chamber on the occupant may be further weakened.

Effects of the Invention

As described hereabove, according to a side airbag device for a vehicle relating to the first aspect relating to the present invention, excellent effects are provided in that the high-pressure chamber of the side airbag may be inflated and expanded promptly and in that the inner pressure of the high-pressure chamber may be maintained for a long time.

According to the side airbag device for a vehicle relating to the second aspect, excellent effects are provided in that the waist area of an occupant sitting on a vehicle seat may be restrained promptly and at a high pressure by the lower chamber, and at least one of a chest area and shoulder area of the occupant may be restrained by the upper chamber.

According to the side airbag device for a vehicle relating to the third aspect, excellent effects are provided in that sewing in order to improve airtightness may be omitted, fabrication of the side airbag may be simplified, and a large reduction in costs may be promoted.

According to the side airbag device for a vehicle relating to the fourth aspect, an excellent effect is provided in that strength with respect to high-temperature, high-pressure gas that is supplied toward the check valve from the gas discharge section of the inflator may be improved.

According to the side airbag device for a vehicle relating to the fifth aspect, an excellent effect is provided in that the inner pressure of the high-pressure chamber may be more stably maintained.

According to the side airbag device for a vehicle relating to the sixth aspect, an excellent effect is provided in that occupant restraint performance in a side collision may be further improved.

According to the side airbag device for a vehicle relating to the seventh aspect, an excellent effect is provided in that the inner pressure of the lower chamber that is the high-pressure chamber may be more stably maintained.

According to the side airbag device for a vehicle relating to the eighth aspect, an excellent effect is provided in that the lower chamber and the upper chamber may both be stably inflated and expanded with a simple structure in which the diffuser is added.

According to the side airbag device for a vehicle relating to the ninth aspect, an excellent effect is provided in that the side airbag may be promptly and smoothly inflated and expanded in the limited space between the occupant and the vehicle side.

According to the side airbag device for a vehicle relating to the tenth aspect, an excellent effect is provided in that the uppermost chamber of the side airbag may be promptly and smoothly inflated and expanded in the limited space between the upper body of the occupant and the vehicle side.

According to the side airbag device for a vehicle relating to the eleventh aspect, an excellent effect is provided in that restraining force of the middle portion on the occupant may be further weakened.

BRIEF DESCRIPTION OF THE DRAWINGS

FIG. 1 is a side elevation illustrating a state in which a side airbag is inflated and expanded to the side of an occupant sitting on a vehicle seat.

FIG. 2 is a side elevation illustrating a side airbag.

FIG. 3 is a magnified sectional diagram taken along arrows 3-3 in FIG. 2, illustrating a state during operation of an inflator, in which state a check valve is opened by the pressure of gas discharged through a first aperture portion of a diffuser to a lower chamber and the gas is supplied into the lower chamber, and gas is discharged through a second aperture portion into an upper chamber.

FIG. 4 is a magnified sectional diagram taken along arrows 4-4 in FIG. 2, illustrating a state in which the discharge of gas from the inflator has been completed and the check valve has closed.

FIG. 5 is a magnified sectional diagram taken along arrows 5-5 in FIG. 2, illustrating a structure in which the side airbag interior is partitioned into an upper chamber and a lower chamber.

FIG. 6 is a magnified sectional diagram taken along arrows 6-6 in FIG. 2, illustrating a theory of closing of the check valve, with the inflator, the diffuser and a partition wall being omitted from the drawing.

FIG. 7 is a magnified sectional diagram taken along arrows 7-7 in FIG. 2, illustrating an example in which a reinforcement cloth is superposed with and sewn to the check valve, with the inflator, the diffuser and the partition wall being omitted from the drawing.

FIG. 8 to FIG. 10 relate to a first structural example of the diffuser.

FIG. 8 is a perspective diagram illustrating a state in which the diffuser is mounted to an inflator.

FIG. 9 is a magnified sectional diagram taken along arrows 9-9 in FIG. 2, illustrating a state in which the inflator and the side airbag are fixed by fastening to a seatback frame, and gas from the inflator is supplied through a second aperture portion of the diffuser to the upper chamber.

FIG. 10 is a magnified perspective diagram illustrating a slit formed in an outer periphery portion of the diffuser being closed, after a stud bolt has been passed along the slit, by a pair of cut-and-lifted portions formed at the two sides of the slit being folded down and caulked.

FIG. 11 relates to a second structural example of the diffuser, and is a magnified perspective diagram illustrating a slit formed in an outer periphery portion of the diffuser being closed, after a stud bolt has been passed along the slit, by a cut-and-lifted portion formed at one side of the slit being folded down and caulked.

FIG. 12 relates to a third structural example of the diffuser, and is a magnified perspective diagram illustrating a stud bolt being passed through and fitted to a substantially L-shaped slit formed in an outer periphery portion of the diffuser.

FIG. 13 is a perspective diagram illustrating a state in which the gas discharge section of the inflator is inserted into the diffuser and a stud bolt at the gas discharge section is inserted into a slit.

FIG. 14 is a magnified sectional diagram taken along arrows 14-14 in FIG. 13, illustrating the state in which the gas discharge section of the inflator is inserted into the diffuser and the stud bolt at the gas discharge section is inserted into the slit.

FIG. 15 is a perspective diagram illustrating a state in which mounting of the diffuser to the inflator is completed.

FIG. 16 is a magnified sectional diagram taken along arrows 16-16 in FIG. 15, illustrating the state in which mounting of the diffuser to the inflator is completed.

FIG. 17 is a sectional diagram, corresponding to FIG. 9, illustrating a state in which the inflator and the side airbag are fixed by fastening to a seatback frame and gas from the inflator is supplied through a second aperture portion of the diffuser to the upper chamber.

FIG. 18 is a side elevation illustrating a side airbag.

FIG. 19 is a magnified sectional diagram taken along arrows 19-19 in FIG. 18, illustrating a state during operation of an inflator, in which state a check valve is opened by the pressure of gas discharged through a first aperture portion of a diffuser to a lower chamber and the gas is supplied into the lower chamber, and gas discharged through a second aperture portion is supplied into an upper chamber.

FIG. 20 is a magnified sectional diagram taken along arrows 20-20 in FIG. 18, illustrating a state in which the check valve is opened.

FIG. 21 is a magnified sectional diagram taken along arrows 21-21 in FIG. 18, illustrating a state in which the check valve is closed.

FIG. 22 is a magnified sectional diagram taken along arrows 22-22 in FIG. 18, illustrating a state in which the discharge of gas from the inflator is completed and the check valve is closed.

BEST MODE FOR CARRYING OUT THE INVENTION

Herebelow, exemplary embodiments of the present invention are described on the basis of the attached drawings.

-First Exemplary Embodiment-

Figure 1:
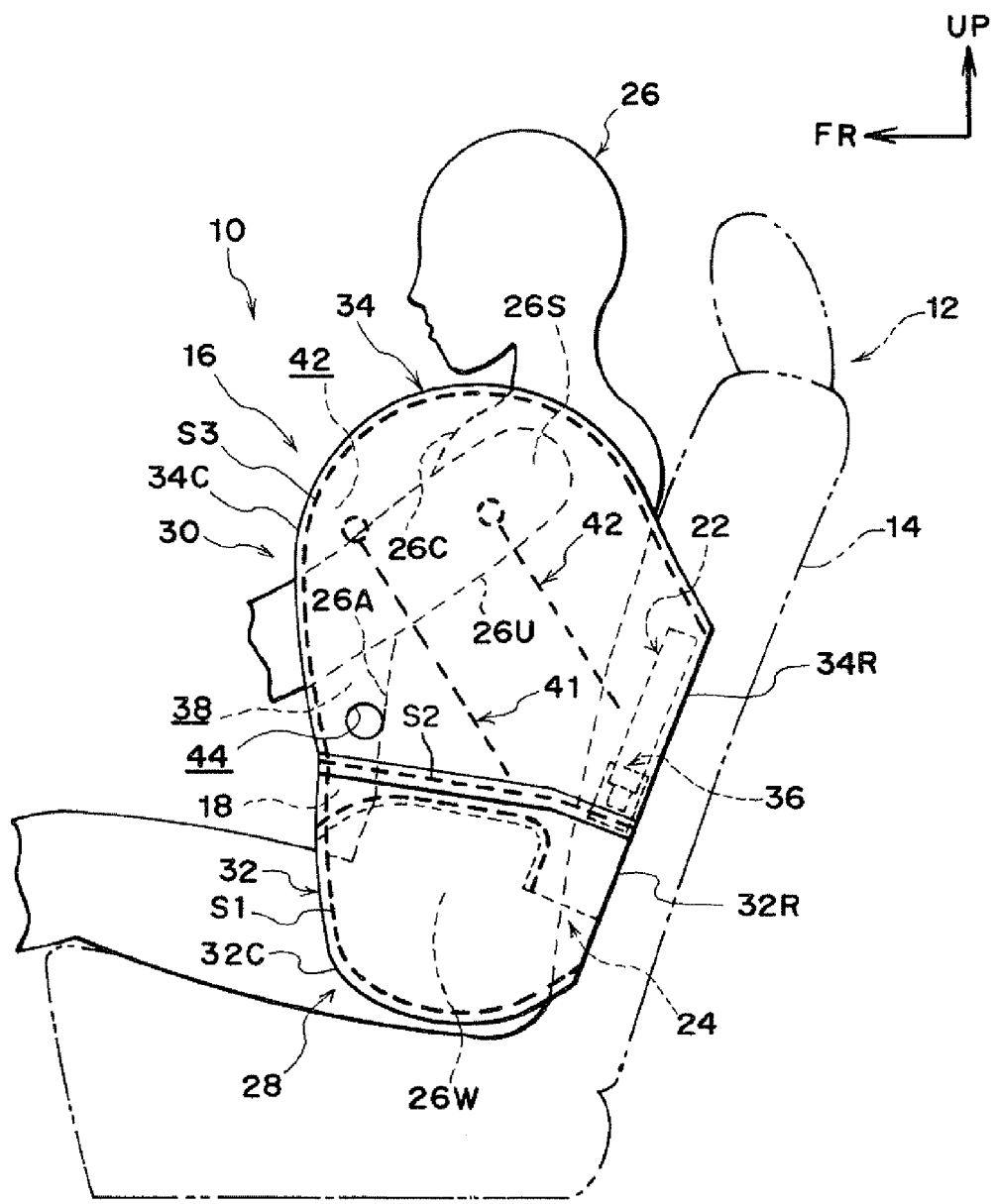
FIG. 1 to FIG. 12 relate to a first exemplary embodiment.
Figure 2:
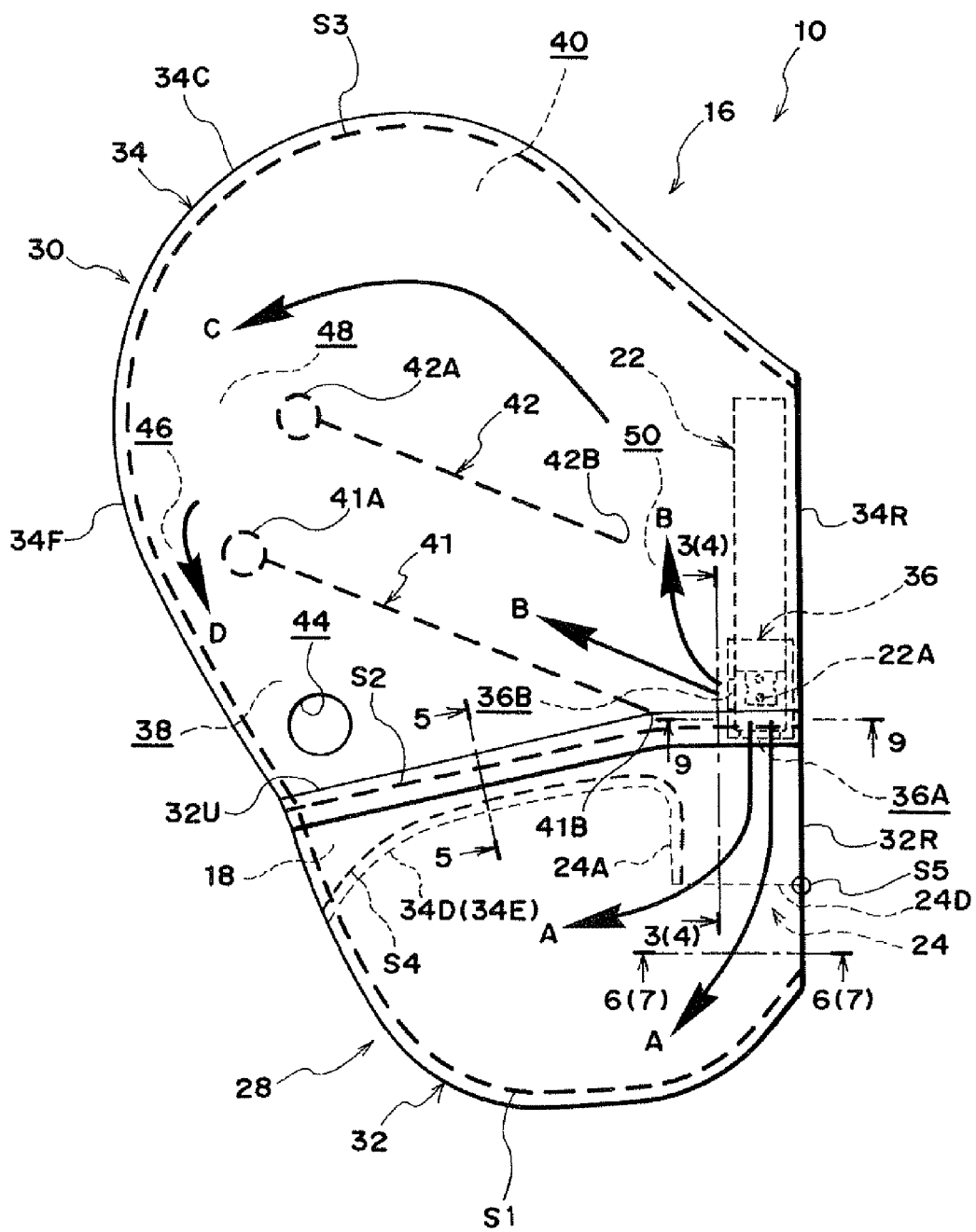
Figure 3:
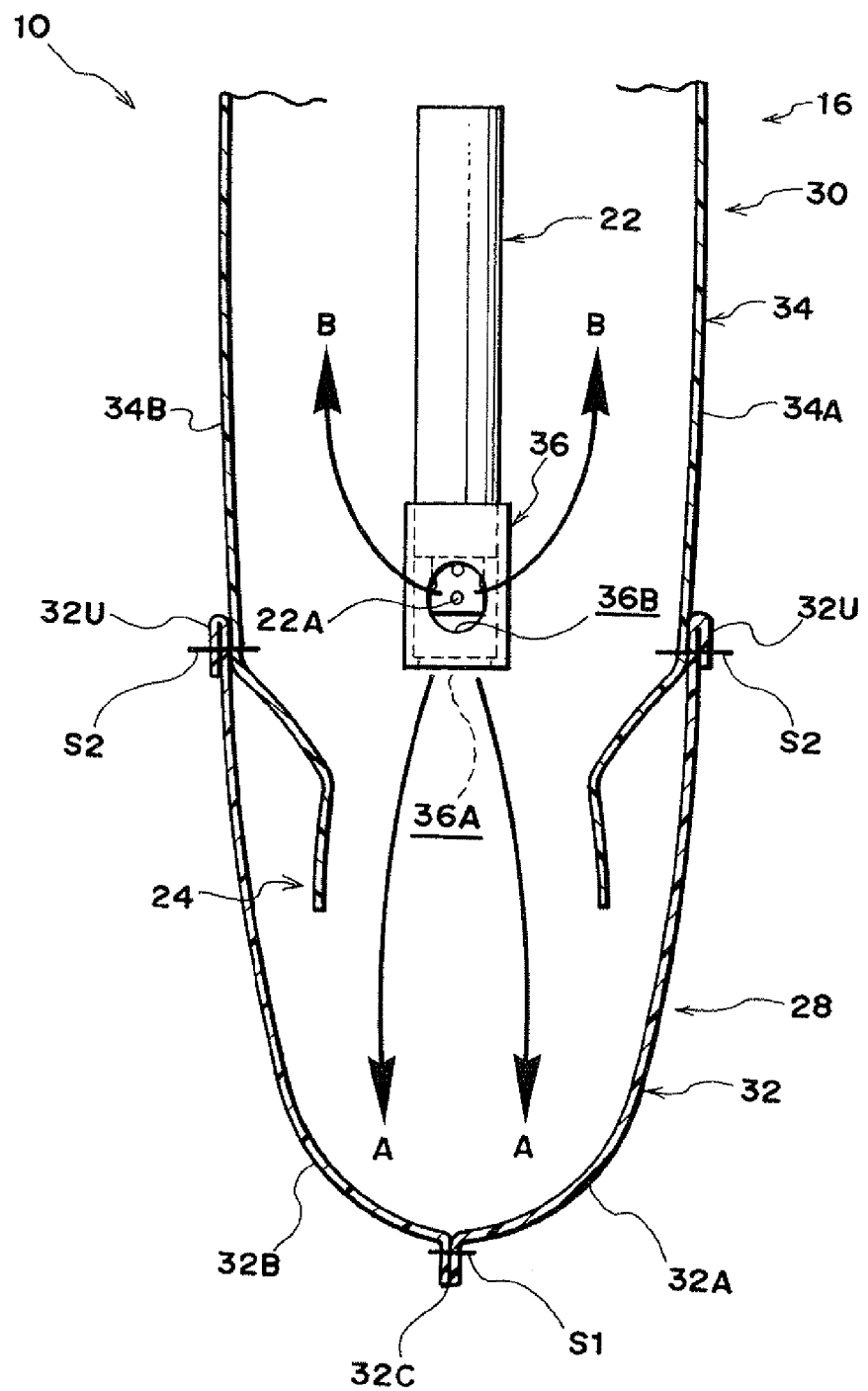

FIG. 1 to FIG. 3 relate to a side airbag device at which a side airbag device for a vehicle 10 relating to the present exemplary embodiment is mounted at, for example, a side portion of a seatback 14 of a vehicle seat 12. The side airbag device for a vehicle 10 includes a side airbag 16, a partition wall 18, an inflator 22 and a check valve 24.

The side airbag 16 is constituted to be supplied with gas from the inflator 22 at the time of a side collision, and to inflate and expand at the side of a vehicle occupant 26 sitting on the vehicle seat 12. The side airbag 16 includes a lower chamber 28, serving as an example of a high-pressure chamber that is at a higher pressure during inflation and expansion, and an upper chamber 30, serving as an example of a low-pressure chamber that is at a lower pressure than the high-pressure chamber. In a side collision, the lower chamber 28 and the upper chamber 30 both inflate and expand.

The lower chamber 28 is formed by a lower fabric 32, is an inflating portion that is disposed at the seat lower side of the side airbag 16 in the inflated and expanded state, and corresponds with a waist area 26W of the occupant 26 sitting on the vehicle seat 12. The lower chamber 28 is formed by an outer side fabric 32A of the lower fabric 32, which is disposed at the seat width direction outer side with respect to the vehicle seat 12, and an inner side fabric 32B, which is disposed at the seat width direction inner side, being folded in two to the seat forward side about a seat rearward end portion 32R of the lower fabric 32 and sewn together at a periphery edge portion 32C (a sewn portion S1). In order to improve airtightness of the lower chamber 28 serving as the high-pressure chamber, a coating may be applied to the inner face of the lower fabric 32.

Figure 4:
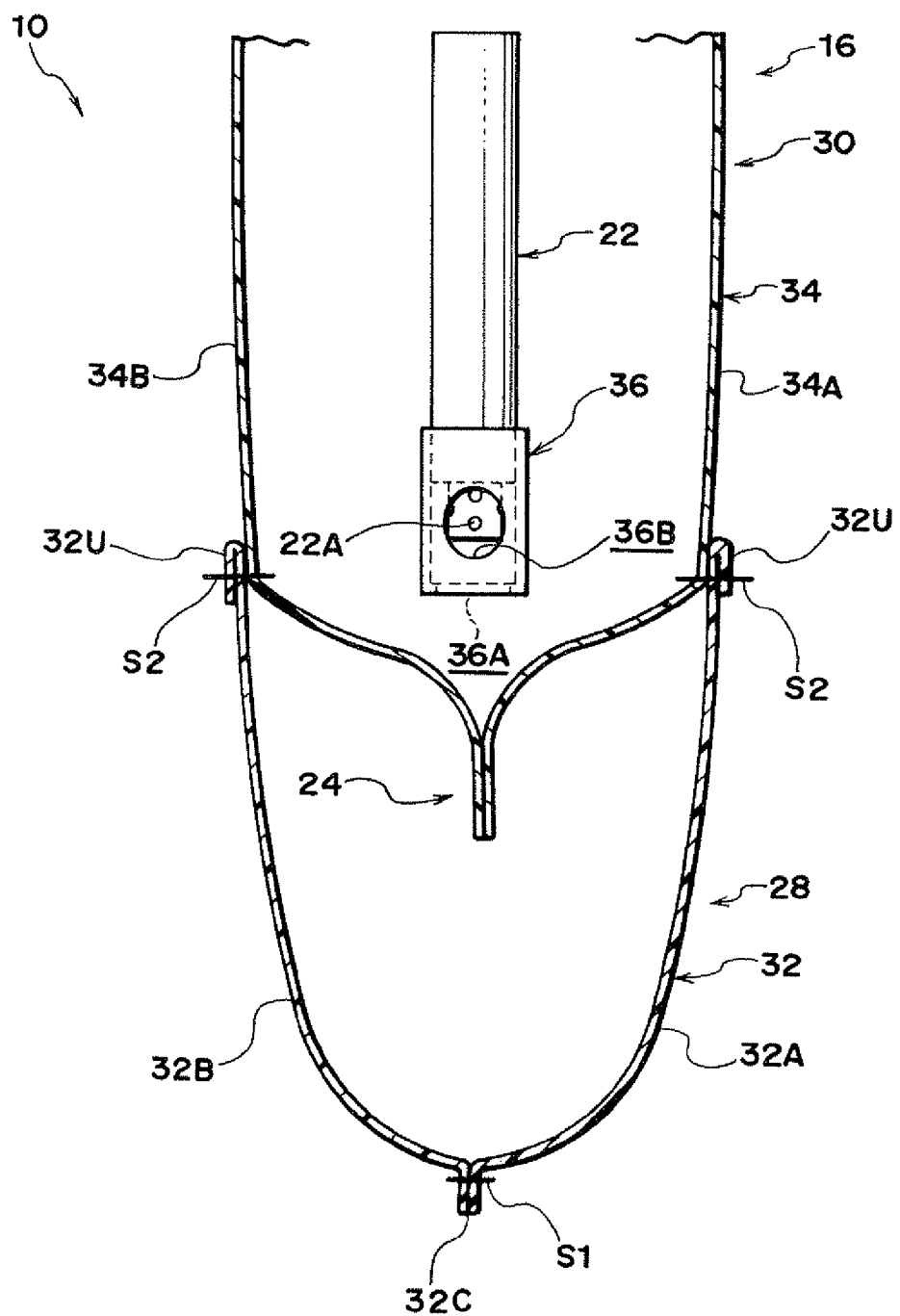
Figure 5:
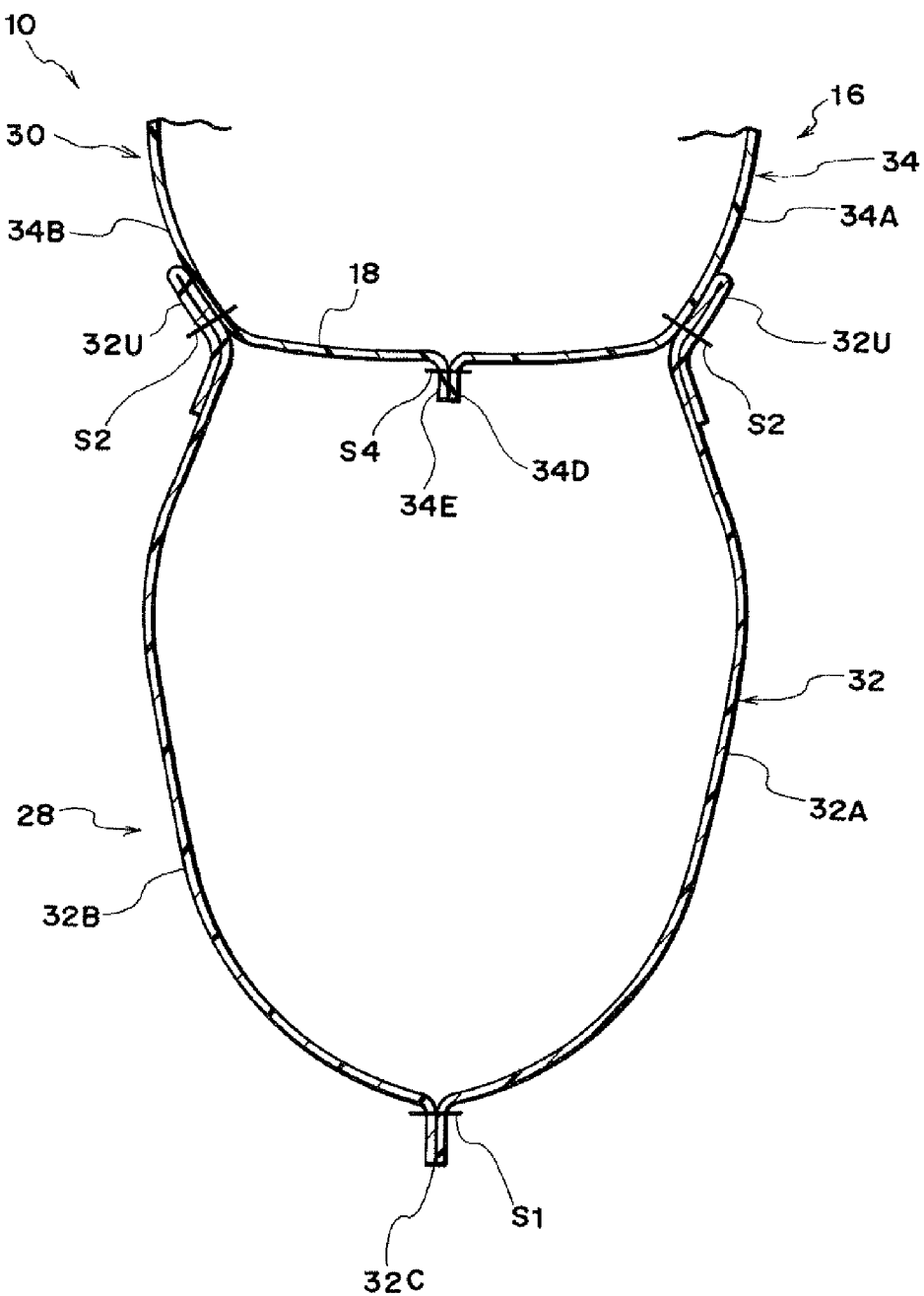

An upper fabric 34 constitutes the upper chamber 30. A lower region of the upper fabric 34 is used as the partition wall 18. An upper end portion 32U of the lower fabric 32 is sewn (a sewn portion S2) to a bag outer face side of an upper end of the lower region of the upper fabric 34. As illustrated in FIG. 3 to FIG. 5, the upper end portion 32U of the lower fabric 32 is sewn to the upper fabric 34 with the upper end portion 32U folded over and the thickness increased, in order to reinforce the sewn portion S2. This reinforcement is not limited to folding of the upper end portion 32U and may have, for example, a separate member for reinforcement being superimposed and sewn on.

In FIG. 1, the upper chamber 30 is constituted by the upper fabric 34, and is an inflating portion that is disposed at the seat upward side of the side airbag 16 in the inflated and expanded state. The upper chamber 30 corresponds with one or both of a chest area 26C and a shoulder area 26S of the occupant 26 sitting on the vehicle seat 12. In the present exemplary embodiment, the upper chamber 30 corresponds with both the chest area 26C and the shoulder area 26S of the occupant 26, and also corresponds with an upper arm area 26U and an abdomen area 26A. As illustrated in FIG. 1 to FIG. 3, the upper chamber 30 is formed by an outer side fabric 34A of the upper fabric 34, which is disposed at the seat width direction outer side with respect to the vehicle seat 12, and an inner side fabric 34B, which is disposed at the seat width direction inner side, being folded in two toward the seat forward side about a seat rearward end portion 34R of the upper fabric 34 and sewn together at a periphery edge portion 34C (a sewn portion S3).

In FIG. 5, the partition wall 18 is provided in the side airbag 16 and is a portion that partitions the lower chamber 28 that is the high-pressure chamber from the upper chamber 30 that is the low-pressure chamber. The partition wall 18 is formed by sewing together (a sewn portion S4), of the upper fabric 34 constituting the upper chamber 30, a lower end 34D of the outer side fabric 34A disposed at the seat width direction outer side with respect to the vehicle seat 12 and a lower end 34E of the inner side fabric 34B disposed at the seat width direction inner side. As illustrated in FIG. 1, the partition wall 18 is provided at a location of the side airbag 16 that, in the inflated and expanded state, corresponds with the abdomen area 26A of the occupant 26 sitting on the vehicle seat 12.

In FIG. 2 and FIG. 3, the inflator 22 is a gas generation source that is disposed in the upper chamber 30 that is the low-pressure chamber, with a gas discharge section 22A facing the lower chamber 28 that is the high-pressure chamber, supplies gas for inflation mainly to the lower chamber 28, and also supplies the gas for inflation to the upper chamber 30. In the inflated and expanded state, the inflator 22 is disposed in the side airbag 16 at the vehicle front to rear direction side with respect to the vehicle seat 12, specifically in the vicinity of a vehicle front to rear direction rear side end portion.

Although not illustrated, the inflator 22 is connected to an airbag electronic control unit (ECU) via a wire harness, and is constituted to be operated by an operating current from the airbag ECU and supply gas for inflation to the side airbag 16. The airbag ECU causes the operation current to flow to the inflator 22 when the airbag ECU identifies a side collision in accordance with a signal from a collision sensor (not illustrated).

Figure 8:
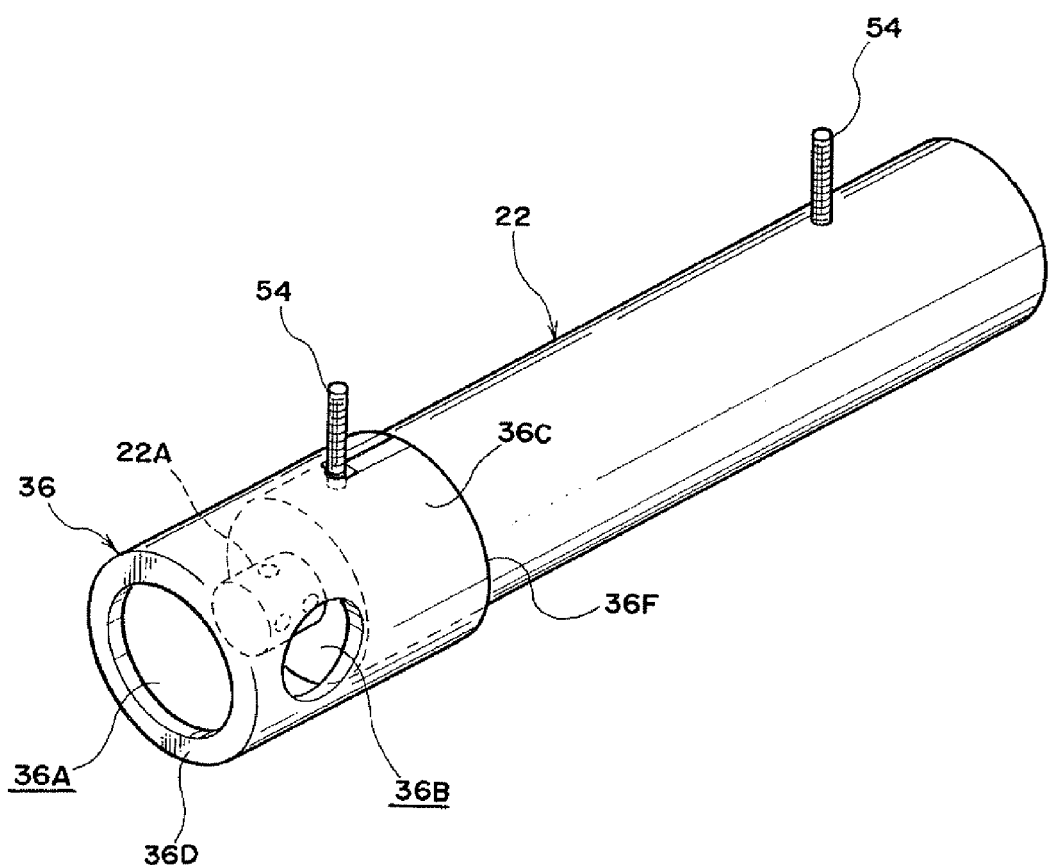

A diffuser 36 is disposed at the gas discharge section 22A of the inflator 22. The diffuser 36 is formed in, for example, a tubular shape, and is provided with a first aperture portion 36A that opens toward the lower chamber 28 and a second aperture portion 36B that opens toward the upper chamber 30 in, for example, the seat forward direction. Thus, the diffuser 36 is constituted to restrict flows of the gas discharged from the gas discharge section 22A of the inflator 22. Specifically, the gas mainly flows through the first aperture portion 36A into the lower chamber 28, and is also distributed through the second aperture portion 36B to the upper chamber 30. As illustrated in FIG. 8, in order for the gas to mainly flow to the lower chamber 28 while also being distributed to the upper chamber 30, an opening area of the first aperture portion 36A of the diffuser 36 is specified to be larger than an opening area of the second aperture portion 36B. Structural examples of the diffuser 36 and mounting thereof to the inflator 22 are described below.

In FIG. 1 and FIG. 2, in the upper chamber 30 of the side airbag 16, a first seam 41 is provided that extends, for example, in a straight line forward with respect to the seat and diagonally upward from the diffuser 36 side thereof. The first seam 41 is an example of a first bag thickness regulation portion. At the first seam 41, the outer side fabric 34A of the upper fabric 34 constituting the upper chamber 30 and the inner side fabric 34B disposed at the seat width direction inner side are sewn together. The first seam 41 partitions the upper chamber 30 between a middle chamber 38 at the seat lower side thereof and an uppermost chamber 40 at the seat upper side thereof. A vent hole 44 is formed in a portion of the upper fabric 34 that constitutes the middle chamber 38. An inner pressure of the middle chamber 38 during inflation and expansion of the side airbag 16 is set to a lower pressure than that of the uppermost chamber 40.

A predetermined constriction gap 46 is formed between a seat forward side distal end portion 41A of the first seam 41 and a seat forward side periphery edge portion 34F of the upper fabric 34 of the upper chamber 30. Thus, as illustrated in FIG. 2, when the inflator 22 operates, the gas discharged through the second aperture portion 36B of the diffuser 36 is supplied in the directions of arrows 13 and the direction of arrow C in the uppermost chamber 40, and also passes through the constriction gap 46 and is supplied to the middle chamber 38 in the direction of arrow D.

A vehicle front to rear direction rear side distal end portion 41B of the first seam 41 is specified to be at, for example, a location near the partition wall 18. This is in order to restrict the gas, which is discharged through the second aperture portion 36B of the diffuser 36 when the side airbag 16 inflates and expands, from flowing into the middle chamber 38 through the gap between the vehicle front to rear direction rear side distal end portion 41B of the first seam 41 and the partition wall 18 and raising the inner pressure of the middle chamber 38 more than is required.

In FIG. 1 and FIG. 2, a second seam 42 at which the outer side fabric 34A and the inner side fabric 34B are sewn together is provided in the upper chamber 30 at the seat upper side with respect to the first seam 41. The second seam 42 extends in, for example, a straight line to the seat forward side and diagonally upward from the diffuser 36 side thereof, with a predetermined spacing from the first seam 41. The second seam 42 is an example of a second bag thickness restriction portion. The second seam 42 is disposed in the uppermost chamber 40 of the upper chamber 30. Similarly to the first seam 41, the outer side fabric 34A and inner side fabric 34B are sewn together at the second seam 42.

As illustrated in FIG. 1, a seat forward side distal end portion 42A of the second seam 42 is set to a location corresponding with the upper arm area 26U and/or shoulder area 26S of the occupant 26. A gap 48 between the seat forward side distal end portion 42A and the seat forward side periphery edge portion 34F of the upper fabric 34 is specified to be larger than the predetermined constriction gap 46 between the seat forward side distal end portion 41A of the first seam 41 and the seat forward side periphery edge portion 34F. A gap 50 between a vehicle front to rear direction rear side distal end portion 42B of the second seam 42 and the inflator 22 is also specified to be larger than the predetermined constriction gap 46. This is to prevent a difference between inner pressures above and below the second seam 42 in the uppermost chamber 40 arising when the side airbag 16 inflates and expands. On the other hand, if a difference is to be provided between inner pressures above and below the second seam 42 in the uppermost chamber 40 or if a flow of gas in the uppermost chamber 40 is to be restricted, the positions of the seat forward side distal end portion 42A and the vehicle front to rear direction rear side distal end portion 42B may be suitably amended and the gaps 48 and 50 adjusted.

In FIG. 1 and FIG. 2, the seat forward side distal end portion 41A of the first seam 41 and the seat forward side distal end portion 42A of the second seam 42 both have circular shapes, but shapes of these distal end portions are not limited thus. Moreover, the shapes of the first seam 41 and the second seam 42 are not limited to being straight lines, and may be curves, inflected lines or the like. Further, the first seam 41 that is a sewn portion is offered as an example of the first bag thickness regulation portion, and the second seam 42 that is a sewn portion is offered as an example of the second bag thickness regulation portion. However, the first bag thickness regulation portion and the second bag thickness regulation portion are not limited to being sewn portions. For example, the outer side fabric 34A and inner side fabric 34B of the upper fabric 34 may be portions that are joined by, for example, adhesion, welding or the like.

Figure 6:
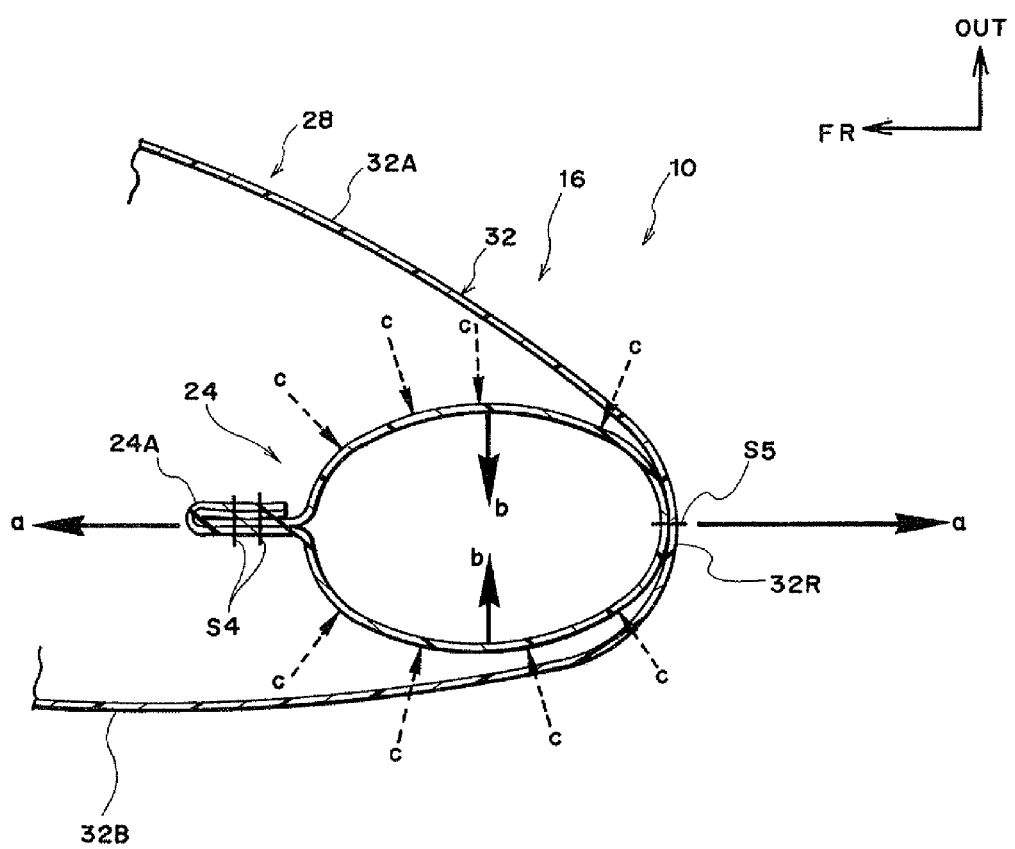

In FIG. 1 to FIG. 4, the check valve 24 is a portion that is provided at the partition wall 18, permits the gas discharged through the gas discharge section 22A of the inflator 22 to flow from the upper chamber 30 that is the low-pressure chamber to the lower chamber 28 that is the high-pressure chamber, and restricts a flow of gas in the opposite direction (FIG. 4). This check valve 24 is disposed at the vehicle front to rear direction rear side of the interior of the side airbag 16, specifically at the seat rearward end portion of the partition wall 18, and is formed in a tubular shape by the upper fabric 34 being extended to the seat downward side. As illustrated in FIG. 2, the lower ends 34D and 34E of the outer side fabric 34A and the inner side fabric 34B are joined to a front edge 24A of the check valve 24. As illustrated in FIG. 6, the front edge 24A is superposed and folded over with the outer side fabric 34A and inner side fabric 34B, and is sewn up in a four-layer condition. Thus, the check valve 24 is formed into the tubular shape.

As illustrated in FIG. 3, when the inflator 22 operates, when the gas discharged from the gas discharge section 22A of the inflator 22 is being discharged through the first aperture portion 36A of the diffuser 36 toward the lower chamber 28, the check valve 24 is opened by the pressure of the gas. Specifically, the outer side fabric 34A and inner side fabric 34B of the upper fabric 34 that constitute the check valve 24 open up into the tubular shape.

As illustrated in FIG. 4, when the discharge of gas from the inflator 22 is completed and the gas tries to flow back from the lower chamber 28 that is the high-pressure chamber to the upper chamber 30 that is the low-pressure chamber, the outer side fabric 34A and inner side fabric 34B of the upper fabric 34 that constitute the check valve 24 make surface contact and close up.

As illustrated in FIG. 2, a lower end portion 24D of the check valve 24 is at least partially sewn to the lower fabric that constitutes the lower chamber 28 (a sewn portion 85). At the sewn portion S5, for example, rear end corner portions of the lower end portion 24D of the check valve 24 are sewn to the seat rearward end portion 32R of the lower fabric 32.

Figure 7:
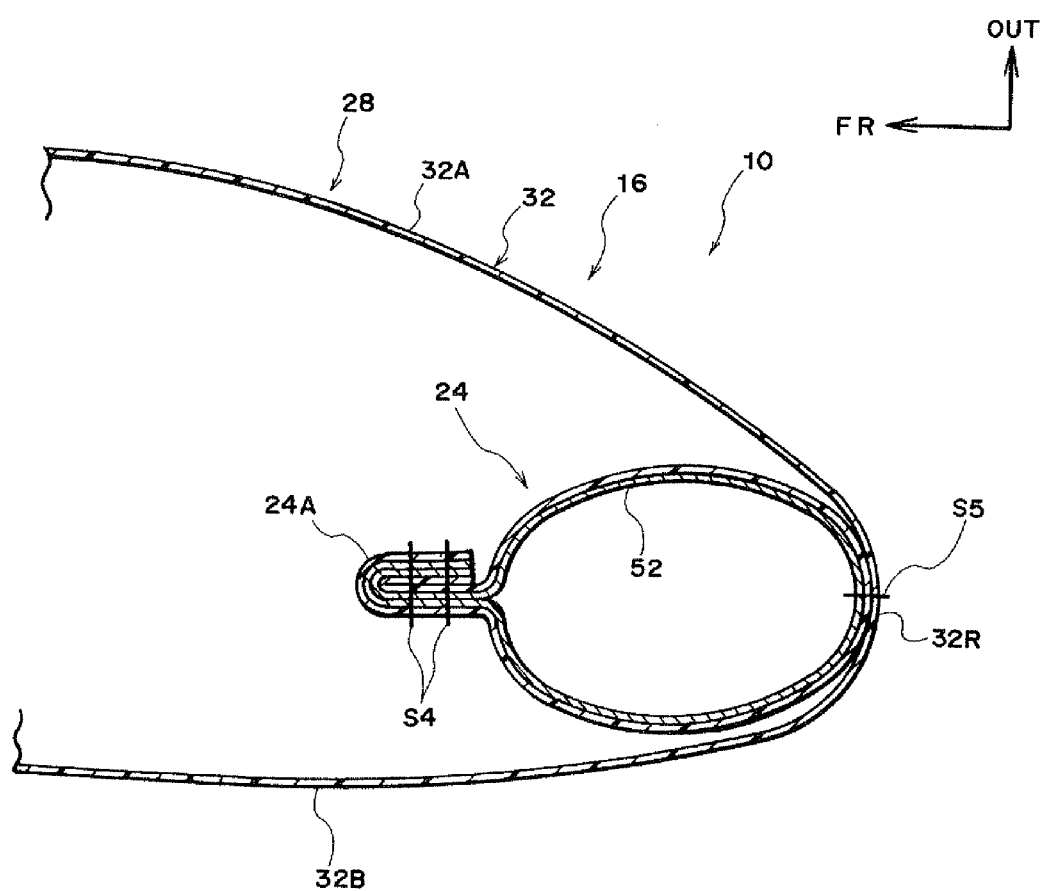

As illustrated in FIG. 7, a reinforcement cloth 52 may be superposed with and sewn to the check valve 24, in order to further improve strength of the check valve 24 with respect to the high-temperature, high-pressure gas that is discharged from the gas discharge section 22A of the inflator 22. In this example, the reinforcement cloth 52 is superposed with and sewn to the inner periphery side of the check valve 24, and the front edge 24A of the check valve 24 is superposed and folded over with the outer side fabric 34A, the inner side fabric 34B and the reinforcement cloth 52, and is sewn up in a six-layer condition. The reinforcement cloth 52 may be superposed with the outer periphery of the check valve 24.

In the structure described above, the lower chamber 28 of the side airbag 16 is formed by sewing the periphery edge portion 32C of the lower fabric 32 and the upper chamber 30 is formed by sewing the periphery edge portion 34C of the upper fabric 34, but this is not a limitation. For example, each chamber may be formed by hollow weaving.

FIG. 6 is a magnified sectional diagram taken along arrows 6-6 of FIG. 2. The check valve 24 portion is not actually in a sectional view but hatching is applied thereto in order to clearly indicate superposition of the layers. The same applies to the check valve 24 and the reinforcement cloth 52 in FIG. 7.

STRUCTURAL EXAMPLES OF THE DIFFUSER AND MOUNTING THEREOF TO THE INFLATOR

First Structural Example

In FIG. 8, the diffuser 36 relating to a first structural example is formed in a circular tube shape with a length and inner diameter into which at least a portion of the inflator 22, from the gas discharge section 22A to a position of a stud bolt 54 at the gas discharge section 22A side, may be inserted. The first aperture portion 36A is formed in a floor portion 36D, and the second aperture portion 36B is formed at, for example, one location of an outer periphery portion 36C. The first aperture portion 36A and the second aperture portion 36B are, for example, both formed in circular shapes. With respect to the gas discharge section 22A of the inflator 22, the second aperture portion 36B is disposed at the radial direction outer side, at the seat forward side of the inflator 22 (see FIG. 2).

Figure 9:
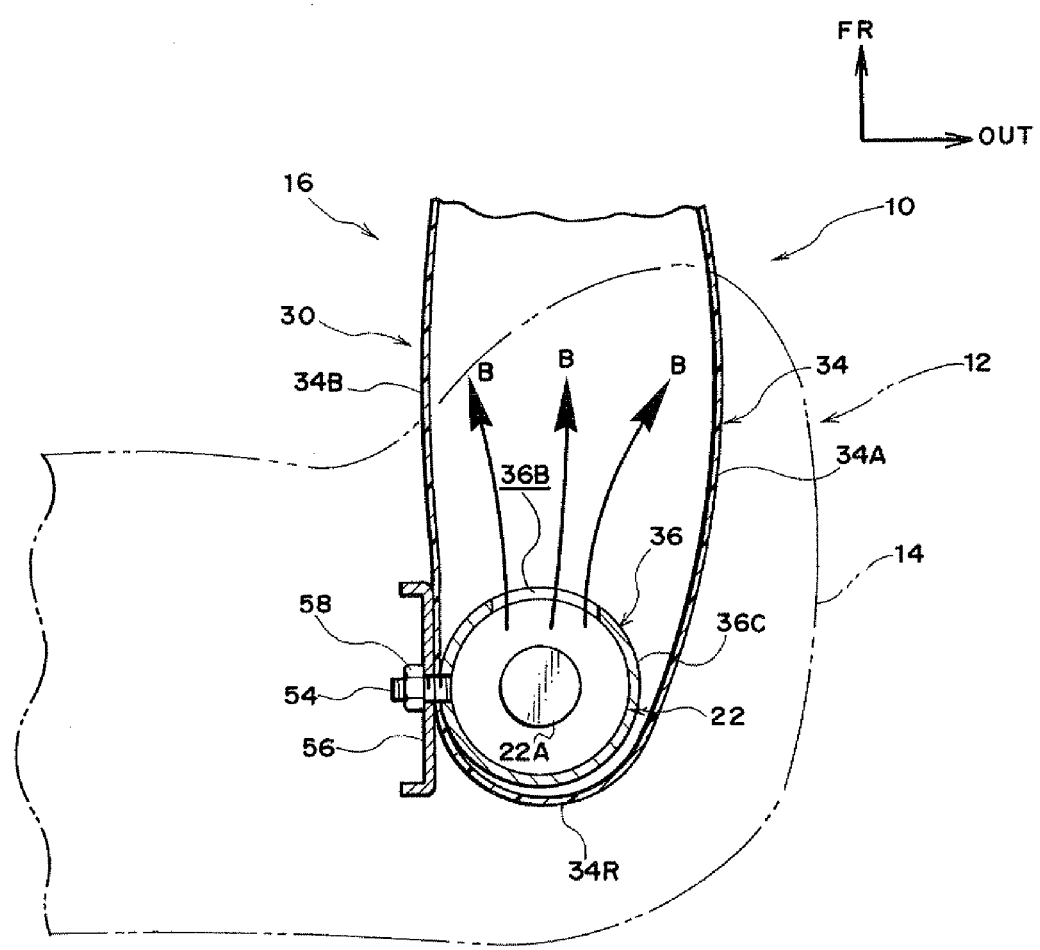

As an example, two of the stud bolt 54 are provided standing from the inflator 22, extending to the seat width direction inner side. As illustrated in FIG. 9, the stud bolts 54 are passed through a seatback frame 56 in the seatback 14 and nuts 58 are fastened onto the stud bolts 54. Thus, the inflator 22, together with the side airbag 16, is fixed to the seatback frame 56. The opening direction of the second aperture portion 36B of the diffuser 36 is to the seat forward side, which is orthogonal to the axial direction of the stud bolts 54.

Figure 10:
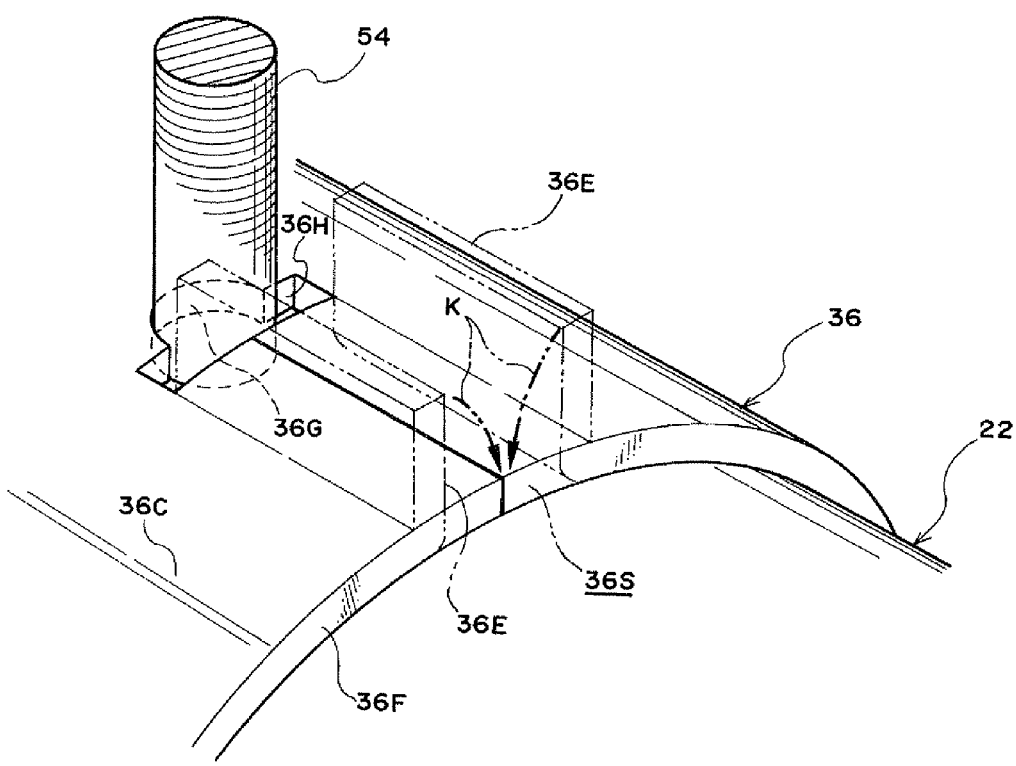

As illustrated in FIG. 10, before the diffuser 36 is mounted to the inflator 22, a pair of cut-and-lifted portions 36E that extend to the radial direction outer side of the diffuser 36 are formed in the outer periphery portion 36C of the diffuser 36. A slit 36S is formed between the pair of cut-and-lifted portions 36E. The slit 36S is wider than an outer diameter of the stud bolt 54, is longer to the floor portion 36D side than the cut-and-lifted portions 36E (FIG. 8), and opens out at an end portion 36F at the opposite end of the slit 36S from the end at which the floor portion 36D is provided. At an end portion 36H at the opposite end of the slit 36S from the opening end, a recess 36G that is, for example, semi-circular is formed to match the outer diameter of the stud bolt 54.

The diffuser 36 is mounted to the inflator 22 in the axial direction to cover the inflator 22. When the diffuser 36 is being mounted, the stud bolt 54 that is at the gas discharge section 22A side passes along the slit 36S of the diffuser 36. The inflator 22 is inserted into the diffuser 36 until the stud bolt 54 engages with the recess 36G. Then, the slit 36S is closed by the pair of cut-and-lifted portions 36E being folded down in the directions of the respective arrows K so as to be in line with the outer periphery portion 36C and are caulked. Thus, mounting of the diffuser 36 to the inflator 22 is completed.

In this state, the outer periphery portion 36C of the diffuser 36 is engaged with the stud bolt 54 at the gas discharge section 22A side, and the diffuser 36 will not be separated from the inflator 22 by the pressure of the gas during operation of the inflator 22.

Second Structural Example

Figure 11:
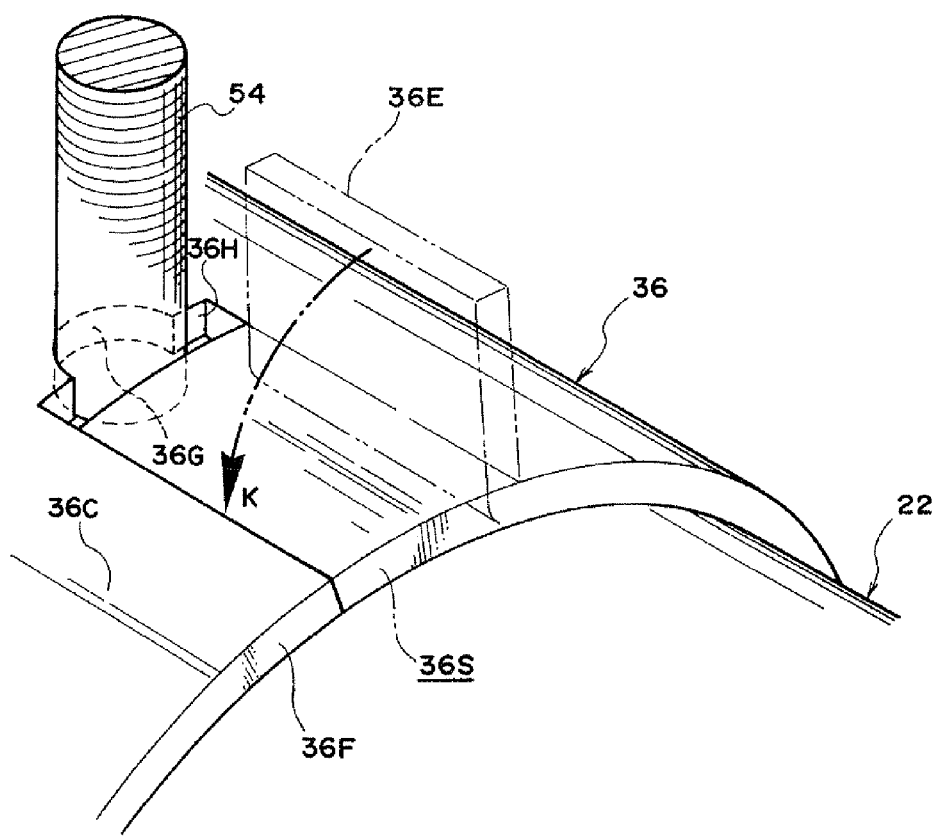

In FIG. 11, the diffuser 36 relating to a second structural example is basically the same as the first structural example but differs from the first structural example in that the cut-and-lifted portion 36E is formed at only one side of the slit 36S. This cut-and-lifted portion 36E extends to the radial direction outer side of the diffuser 36 and matches the width of the slit 36S.

When the diffuser 36 is being mounted to the inflator 22, the inflator 22 is inserted into the diffuser 36 until the stud bolt 54 engages with the recess 36G. Then, the cut-and-lifted portion 36E is folded down in the direction of arrow K so as to be in line with the outer periphery portion 36C and is caulked. Thus, the slit 36S is closed and mounting of the diffuser 36 to the inflator 22 is completed.

Third Structural Example

Figure 12:
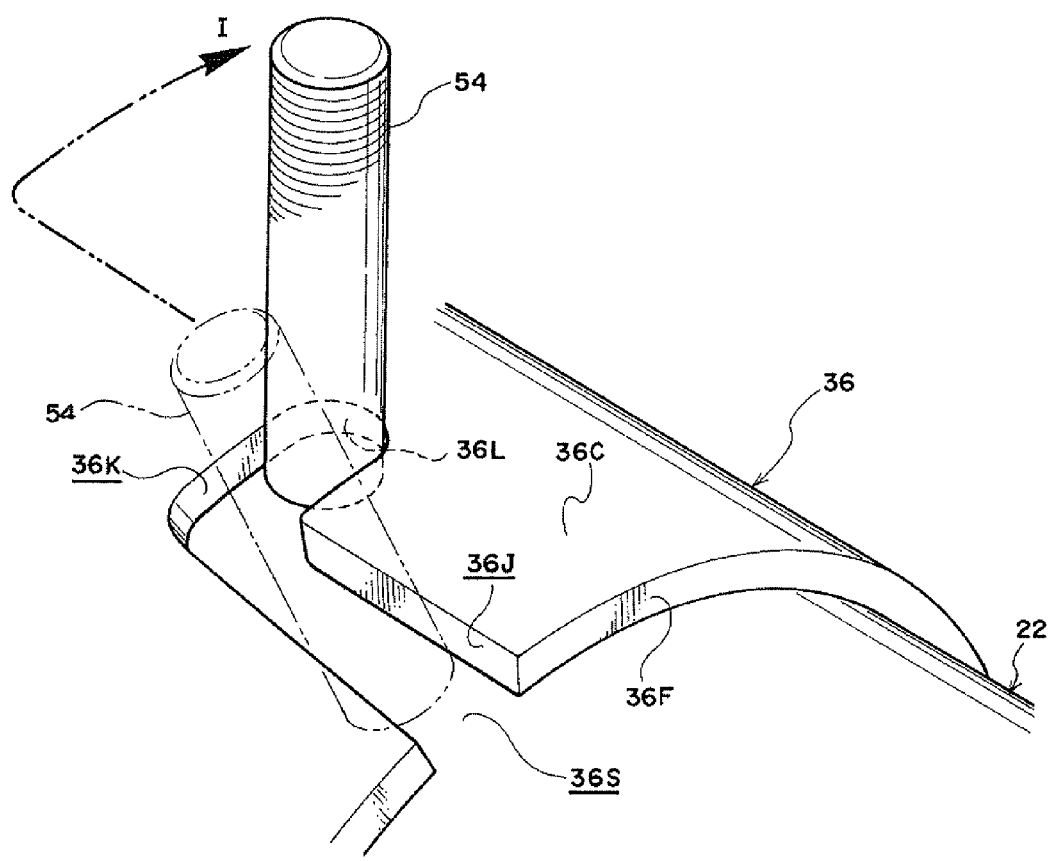

In FIG. 12, the diffuser 36 relating to a third structural example includes an axial direction portion 36J that extends in the axial direction of the diffuser 36 and a circumferential direction portion 36K that extends in the circumferential direction of the diffuser 36 from the end portion of the axial direction portion 36J and comes to a terminal end. Thus, the shape of the slit 36S is a substantial letter "L" shape.

When the diffuser 36 is being mounted to the inflator 22, firstly, the inflator 22 is inserted into the diffuser 36 such that the stud bolt 54 passes along the axial direction portion 36J of the slit 36S. Then, the inflator 22 is turned in the circumferential direction of the diffuser 36 (the direction of arrow I) such that the stud bolt 54 passes along the circumferential direction portion 36K of the slit 36S. When the stud bolt 54 reaches an end portion 36L of the circumferential direction portion 36K, mounting of the diffuser 36 to the inflator 22 is completed.

When the stud bolt 54 has been engaged with the circumferential direction portion 36K of the slit 36S in the axial direction of the inflator 22, the diffuser 36 will not be separated from the inflator 22 by the pressure of the gas during operation of the inflator 22.

The width of the circumferential direction portion 36K may be partially made narrower than the outer diameter of the stud bolt 54 so as to provide a sensation of resistance when the stud bolt 54 reaches the end portion 36L of the circumferential direction portion 36K. Further, the shape of the circumferential direction portion 36K may be structured as a taper shape whose width narrows toward the end portion 36L such that the stud bolt 54 fits to the circumferential direction portion 36K with no gap when reaching the end portion 36L of the circumferential direction portion 36K. Further still, the circumferential direction portion 36K may be angled with respect to the circumferential direction of the diffuser 36 such that an angle formed in the slit 36S between the axial direction portion 363 and the circumferential direction portion 36K is an acute angle.

Fourth Structural Example

Figure 13:
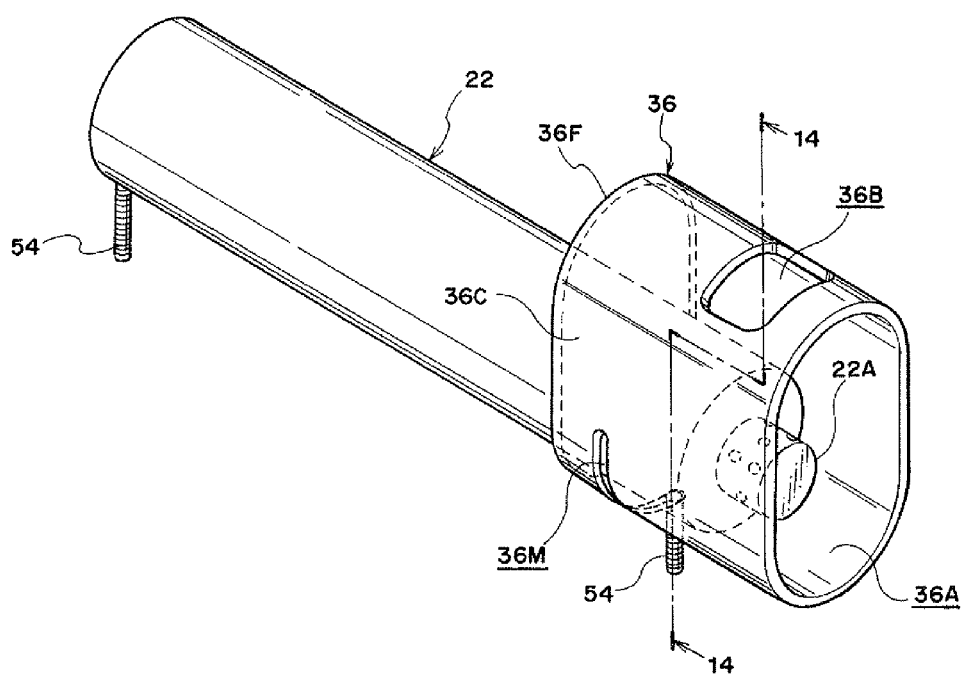
FIG. 13 to FIG. 17 relate to a fourth structural example of a diffuser.
Figure 14:
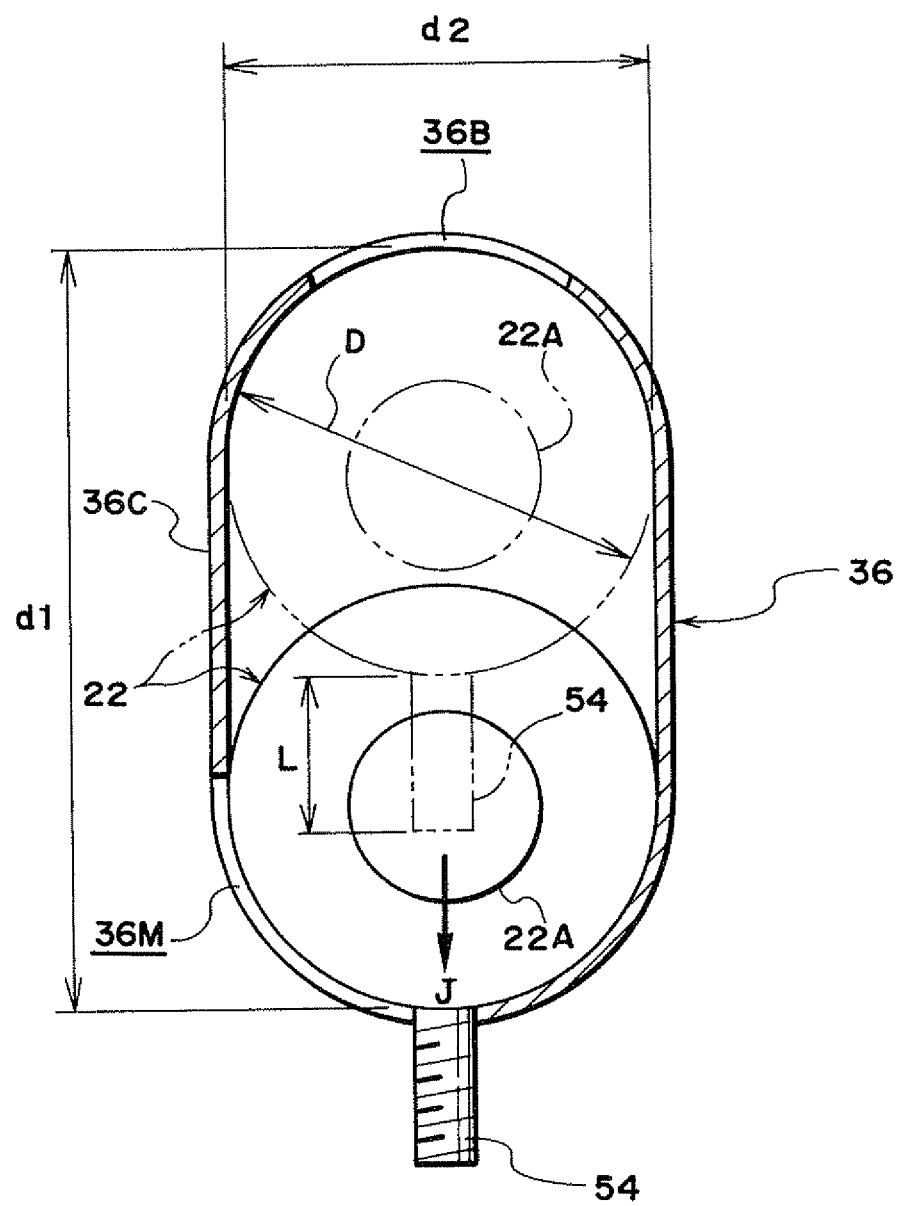

In FIG. 13 to FIG. 16, the diffuser 36 relating to a fourth structural example is constituted in an elongated-circular tube shape with a length into which at least a portion of the inflator 22, from the gas discharge section 22A to the position of the stud bolt 54 at the gas discharge section 22A side, may be inserted. If the outer diameter of the inflator 22 is represented by D and an amount of protrusion of the stud bolt 54 is represented by L, then an inner diameter d1 in the long axis direction of the diffuser 36 is specified such that d1>D+L, and an inner diameter d2 in the short axis direction of the diffuser 36 is specified such that d2>D. Therefore, as illustrated in FIG. 14, when the inflator 22 is being inserted into the diffuser 36, the stud bolt 54 may also be accommodated and inserted.

Upper limits on the inner diameters d1 and d2 are suitably specified to take account of space for mounting of the side airbag device for a vehicle 10 at a side portion of the seatback 14.

As illustrated in FIG. 13 and FIG. 14, a slit 36M is formed in the outer periphery portion 36C of the diffuser 36. The slit 36M extends in the circumferential direction of the outer periphery portion 36C, and the stud bolt 54 at the gas discharge section 22A side may pass along the slit 36M. If the long axis direction of the diffuser 36 is taken to be the vertical direction on the paper of the drawing, the slit 36M is formed, for example, in a range of approximately 90°, roughly from the six o'clock position to the nine o'clock position. In this case, the second aperture portion 36B is formed in a substantially rectangular shape at the 12 o'clock position. As illustrated in FIG. 13, the first aperture portion 36A is formed in, for example, an elongated circle shape, which is the shape of the end portion of the diffuser 36. In FIG. 13, at the end portion 36F of the diffuser 36 that is at the opposite side thereof from the side at which the first aperture portion 36A is provided, an opening is formed between the inflator 22 and the diffuser 36. An unillustrated cap or the like may be attached in order to close off or narrow this opening at the end portion 36F.

In FIG. 14, when the diffuser 36 is being mounted to the inflator 22, a portion of the gas discharge section 22A side of the inflator 22 is inserted into the diffuser 36 together with the stud bolt 54 at the gas discharge section 22A side. At this time, as illustrated by the two-dot chain lines, the inflator 22 is disposed toward the upper side on the paper surface (the 12 o'clock position). Thus, interference between the stud bolt 54 and the diffuser 36 may be inhibited.

Figure 15:
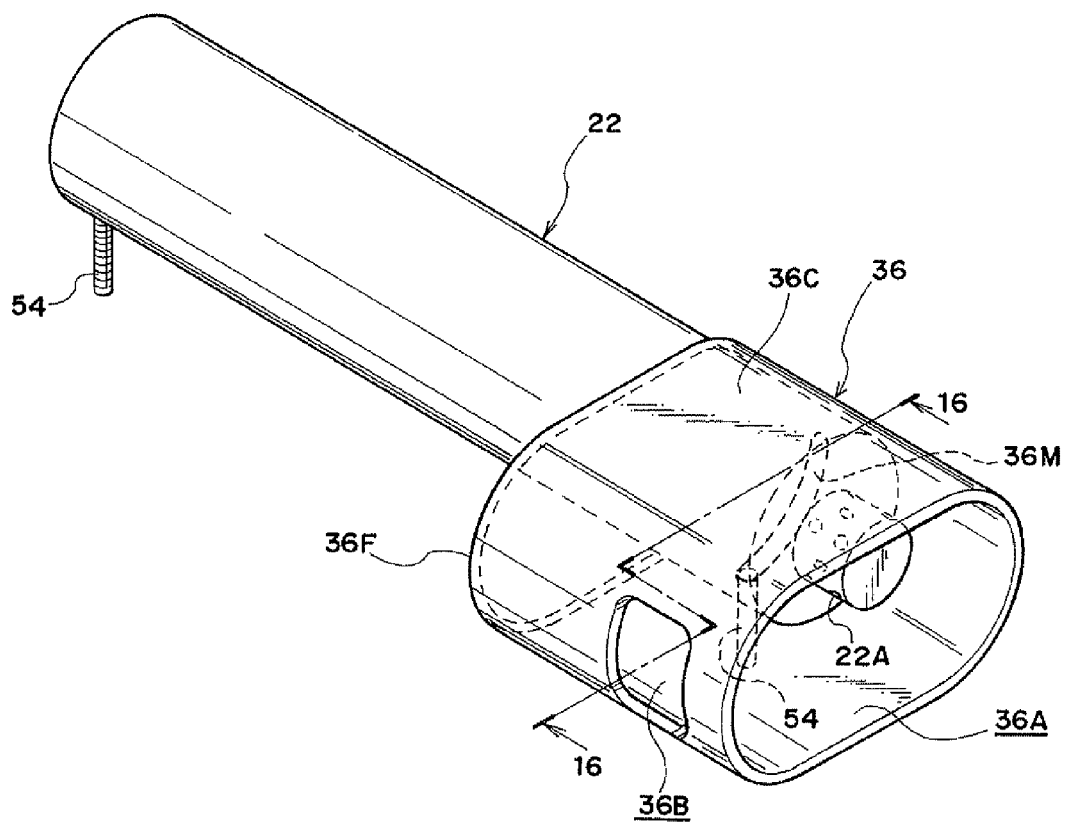
Figure 16:
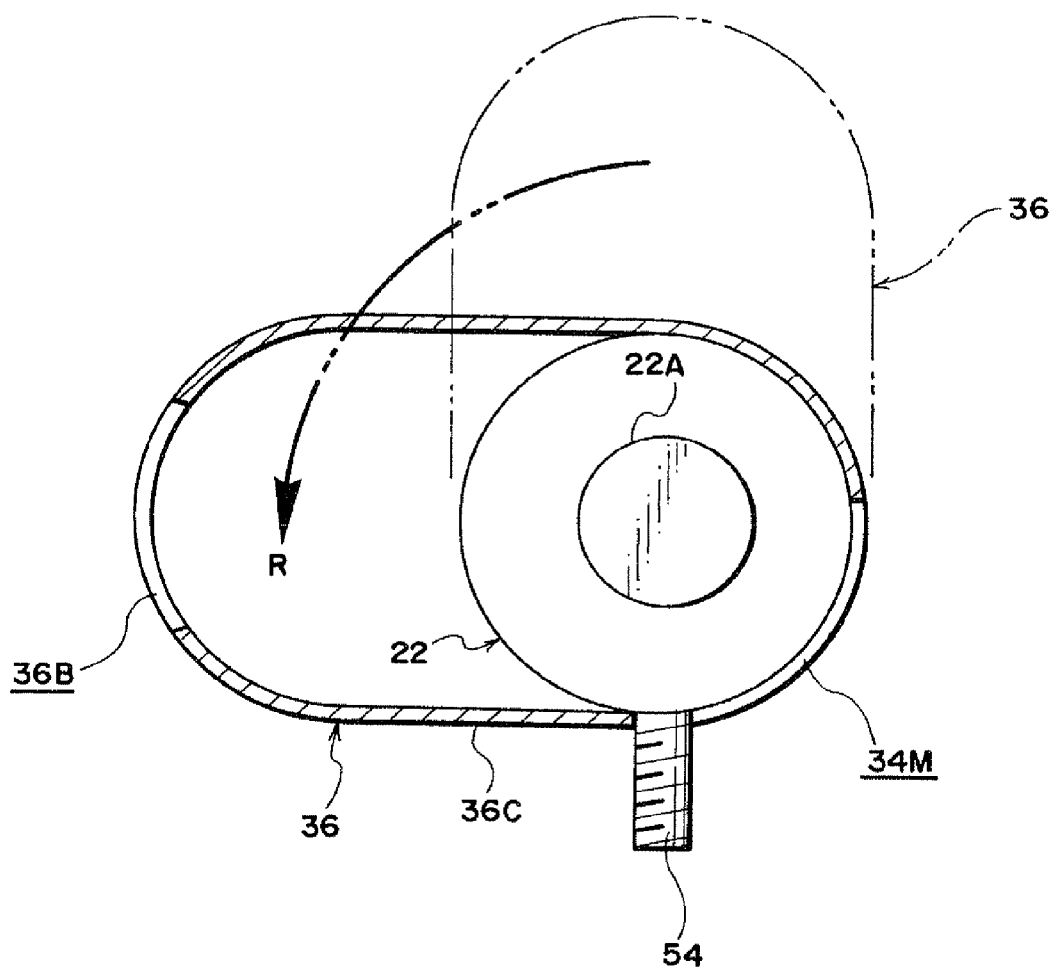

Then, the inflator 22 is moved downward along the paper surface relative to the diffuser 36 (in the direction of arrow J), and the stud bolt 54 at the gas discharge section 22A side is inserted into the slit 36M. Then, as illustrated in FIG. 16, the diffuser 36 is relatively turned through 90° in the direction of arrow R with respect to the inflator 22. At this time, the stud bolt 54 relatively moves in the slit 36M. Thus, as illustrated in FIG. 15, mounting of the diffuser 36 to the inflator 22 is completed.

Figure 17:
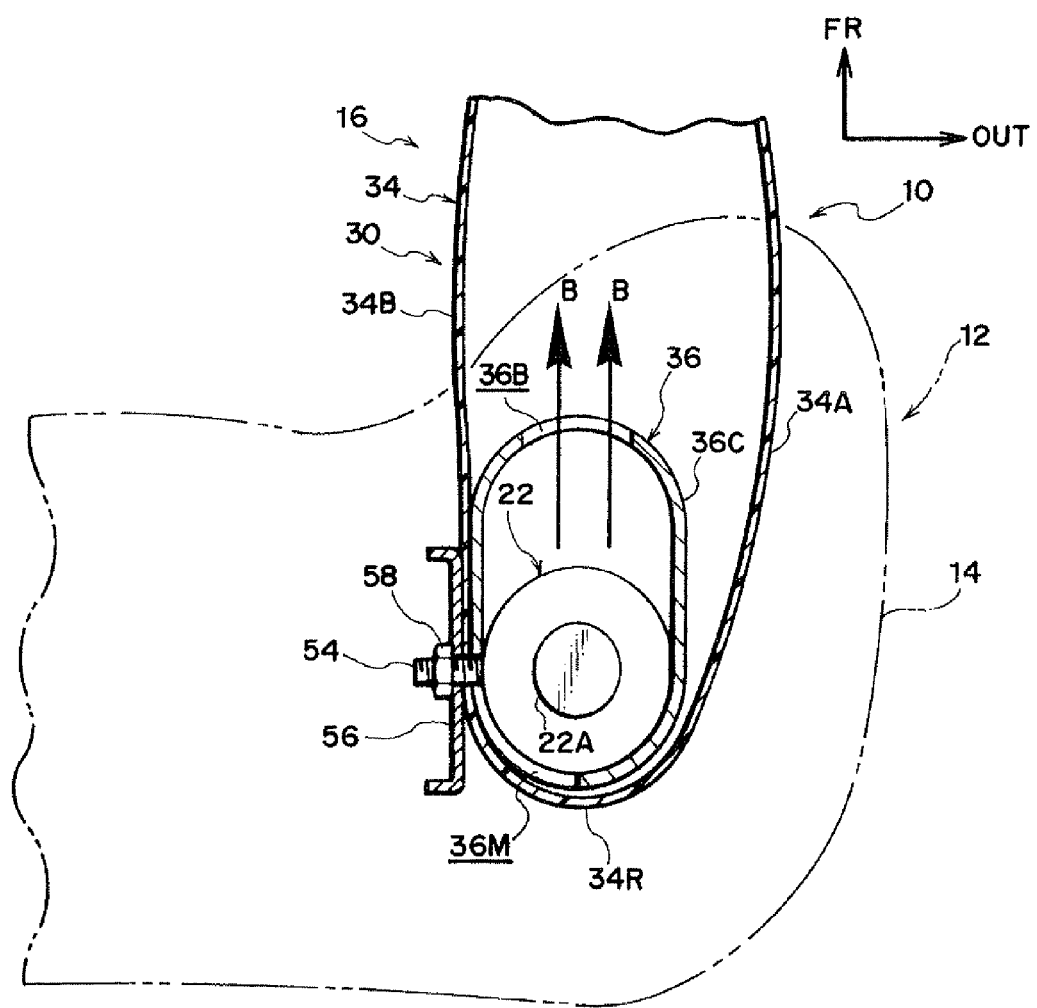

As illustrated in FIG. 17, the inflator 22 and the diffuser 36 are disposed inside the side airbag 16 in this state, and fixed by fastening to the seatback frame 56 along with the side airbag 16. In this state, the opening direction of the second aperture portion 36B of the diffuser 36 is to the seat forward side, and is orthogonal to the axial direction of the stud bolts 54. Because the short axis direction of the diffuser 36 is in the seat width direction, an amount of protrusion of the diffuser 36 in the seat width direction is the same as with the diffusers 36 relating to the first to third structural examples (see FIG. 9).

In the fourth structural example, the stud bolt 54 is engaged with the slit 36M of the diffuser 36 in the axial direction of the inflator 22. Therefore, without the diffuser 36 being separated from the inflator 22 by the pressure of the gas during operation of the inflator 22, the gas for inflating may be mainly supplied through the first aperture portion 36A toward the lower chamber 28 (see FIG. 2) and the gas may also be supplied through the second aperture portion 36B to the upper chamber 30 of the side airbag 16 in the directions of the arrows B.

Numbers, shapes and positions of the first aperture portions 36A and second aperture portions 36B of the diffusers 36 relating to the above structural examples are not limited to those illustrated.

-Operation-

The present exemplary embodiment is constituted as described above, and operations thereof are described herebelow. In FIG. 1, a reclining mechanism (not illustrated) is often provided at the vehicle seat 12 for adjusting an inclination angle of the seatback 14, and it is difficult to guarantee installation space for an airbag module at a lower portion of the side portion of the seatback 14. In the present exemplary embodiment, however, the inflator 22 is disposed in the side airbag 16 at the vehicle front to rear direction rear side and is disposed in the upper chamber 30 that is the low-pressure chamber. Thus, folded dimensions (package dimensions) of the side airbag 16 may be reduced. Therefore, installation characteristics of an airbag module (not illustrated) at the side portion of the seatback 14 are excellent.

As illustrated in FIG. 5, in the side airbag 16, the lower chamber 28 that is the high-pressure chamber and the lower chamber 28 that is the low-pressure chamber are partitioned by the partition wall 18. This partition wall 18 is formed by sewing together, of the upper fabric 34 that constitutes the upper chamber 30, the lower end 34D of the outer side fabric 34A disposed at the seat width direction outer side with respect to the vehicle seat 12 and the lower end 34E of the inner side fabric 34B disposed at the seat width direction inner side. As illustrated in FIG. 2, the check valve 24 is provided at the partition wall 18. The check valve 24 is disposed at the vehicle front to rear direction rear side of the interior of the side airbag 16, and is formed by the upper fabric 34 extending to the seat downward side. Thus, there is no need to add the partition wall 18 and/or the check valve 24 separately from the fabrics that constitute the side airbag 16. Therefore, sewing in order to improve airtightness may be omitted, fabrication of the side airbag 16 is easier, and a large reduction in costs may be promoted.

Next, operation of the side airbag device for a vehicle 10 in a side collision is described. In the side airbag device for a vehicle 10 relating to the present exemplary embodiment in FIG. 1 and FIG. 2, when the airbag ECU determines that a side collision is occurring, on the basis of signals from the unillustrated collision sensor, the operation current is caused to flow from the airbag ECU to the inflator 22. The inflator 22 receives the operation current and operates, and a large quantity of gas is discharged through the gas discharge section 22A. This gas is supplied into the side airbag 16. Thus, the side airbag 16 inflates from the seatback 14, and inflates and expands between the vehicle side (not illustrated) and the occupant 26.

As illustrated in FIG. 2, in the present exemplary embodiment, the inflator 22 is disposed in the upper chamber 30 that is the low-pressure chamber with the gas discharge section 22A facing the lower chamber 28 that is the high-pressure chamber. The diffuser 36 is disposed at the gas discharge section 22A of the inflator 22, and the first aperture portion 36A that opens toward the lower chamber 28 and the second aperture portion 36B that opens toward the upper chamber 30 are formed in the diffuser 36. Flows of the gas may be restricted by this diffuser 36 such that the gas discharged from the gas discharge section 22A mainly passes through the first aperture portion 36A and flows toward the lower chamber 28, and also passes through the second aperture portion 36B and is distributed to the upper chamber 30.

As illustrated in FIG. 3, the check valve 24 is opened in a tubular shape by pressure of the gas that passes through the first aperture portion 36A of the diffuser 36 and is supplied from the inflator 22 in the upper chamber 30 toward the lower chamber 28, and permits the gas to flow into the lower chamber 28 in the directions of the arrows A. Meanwhile, gas passes through the second aperture portion 36B of the diffuser 36 and is supplied in the directions of the arrows B into the upper chamber 30 too. Because the opening area of the first aperture portion 36A of the diffuser 36 is specified to be larger than the opening area of the second aperture portion 36B, the gas for inflation is supplied with precedence to the lower chamber 28 rather than the upper chamber 30. Therefore, the lower chamber 28 inflates and expands more promptly than the upper chamber 30, and has a higher pressure than the upper chamber 30. The lower chamber 28 and the upper chamber 30 may both be stably inflated and expanded with a simple structure in which the diffuser 36 is added.

When the discharge of gas from the inflator 22 is completed, the gas tries to flow back from the lower chamber 28 that is the high-pressure chamber to the upper chamber 30 that is the low-pressure chamber. However, as illustrated in FIG. 4, the check valve 24 closes and the flow of gas is restricted. Therefore, the inner pressure of the lower chamber 28 may be maintained for a longer time. In particular, in the present exemplary embodiment the lower end portion 24D of the cheek valve 24 is at least partially sewn (sewn portion S5) to the lower fabric 32 that constitutes the lower chamber 28. Therefore, when the discharge of gas from the inflator 22 is completed and the gas tries to flow back from the lower chamber 28 that is the high-pressure chamber to the upper chamber 30 that is the low-pressure chamber and the check valve 24 closes, an inversion of the check valve 24 toward the upper chamber 30 is inhibited. In consequence, the inner pressure of the lower chamber 28 that is the high-pressure chamber may be stably maintained.

As a supplementary point concerning operation when the check valve 24 closes, as illustrated in FIG. 6, at the beginning of the discharge of gas from the inflator 22, the pressure in the check valve 24 is very high. Therefore, the check valve 24 tries to open in a circular tube shape. However, because the lower end portion 24D of the check valve 24 is sewn to the seat rearward end portion 32R of the lower fabric 32, the inner pressure of the lower chamber 28 is raised and, with the inflation and expansion of the lower chamber 28 to the seat forward side, a load in the direction of arrow a and loads in the directions of arrows b act on the check valve 24. Then, when the discharge of gas from the inflator 22 is completed, because the inner pressure in the check valve 24 is lower than the inner pressure of the lower chamber 28, distributed loads in the directions of arrows c act on the check valve 24. Because these loads co-operate with one another, the check valve 24 closes more easily.

Next, inflation and expansion of the upper chamber 30 is described. As illustrated in FIG. 2, the upper chamber 30 is partitioned by the first seam 41 into the middle chamber 38 at the seat lower side thereof and the uppermost chamber 40 at the seat upper side. The gas for inflation that is supplied through the second aperture portion 36B of the diffuser 36 is first supplied in the directions of the arrows B into the uppermost chamber 40, and then proceeds to flow in the direction of arrow C. Thus, the uppermost chamber 40 proceeds to inflate and expand. The bag thickness of the upper chamber 30 is regulated by the first seam 41. Furthermore, the second seam 42 is provided in the uppermost chamber 40 of the upper chamber 30 and the bag thickness of the uppermost chamber 40 is regulated by the second seam 42. Therefore, the uppermost chamber 40 may be promptly and smoothly inflated and expanded in the limited space between the upper body of the occupant 26, particularly the shoulder area 26S and upper arm area 26U that protrude furthest to the seat outer side, and the vehicle side. Restraining forces on the shoulder area 26S, the chest area 26C and the upper arm area 26U, which is a region corresponding with the uppermost chamber 40, may be optimized.

The gas supplied into the uppermost chamber 40 passes through the constriction gap 46 between the seat forward side distal end portion 41A of the first seam 41 and the seat forward side periphery edge portion 34F of the upper fabric 34, and is supplied in the direction of arrow D into the middle chamber 38. Therefore, the timing of inflation and expansion of the middle chamber 38 is later than that of the uppermost chamber 40. The vent hole 44 is formed in the portion of the upper fabric 34 that constitutes the middle chamber 38. Thus, both during inflation and expansion of the middle chamber 38 and when a portion of the upper body of the occupant 26, for example, the abdomen area 26A, is being restrained by the middle chamber 38, gas is ejected through the vent hole 44. Thus, the inner pressure of the middle chamber 38 that is set to a lower pressure than in the uppermost chamber 40 is further lowered.

In FIG. 1, during inflation and expansion of the side airbag 16 in the present exemplary embodiment, the lower chamber 28 that is the high-pressure chamber corresponds with the waist area 26W of the occupant 26 and the upper chamber 30 that is the low-pressure chamber corresponds with the chest area 26C, shoulder area 26S, upper arm area 26U and abdomen area 26A of the occupant 26. As described above, the lower chamber 28 inflates and expands prior to the upper chamber 30, and the lower chamber 28 has a higher pressure than the upper chamber 30. Therefore, the waist area 26W of the occupant 26 sitting on the vehicle seat 12 may be restrained more promptly and with a higher pressure by the lower chamber 28. In addition, the inner pressure of the lower chamber 28 may be maintained for a longer time because of the check valve 24, and occupant restraint performance in a side collision may be further improved.

The chest area 26C, shoulder area 26S, upper arm area 26U and abdomen area 26A of the occupant 26 may be restrained by the upper chamber 30 of the side airbag 16. Specifically, mainly the chest area 26C and shoulder area 26S of the occupant 26 may be restrained by the uppermost chamber 40 of the upper chamber 30, and mainly the abdomen area 26A may be restrained by the middle chamber 38. Because the middle chamber 38 is set to a lower pressure than the uppermost chamber 40, a restraining force on the abdomen area 26A by the middle chamber 38 may be made weaker than a restraining force on the shoulder area 26S and the chest area 26C or the like by the uppermost chamber 40.

Thus, with the side airbag device for a vehicle 10 relating to the present exemplary embodiment, respective portions of the upper body of the occupant 26 may be restrained with respectively appropriate restraining forces by the upper chamber 30 of the side airbag 16.

-Second Exemplary Embodiment-

Figure 18:
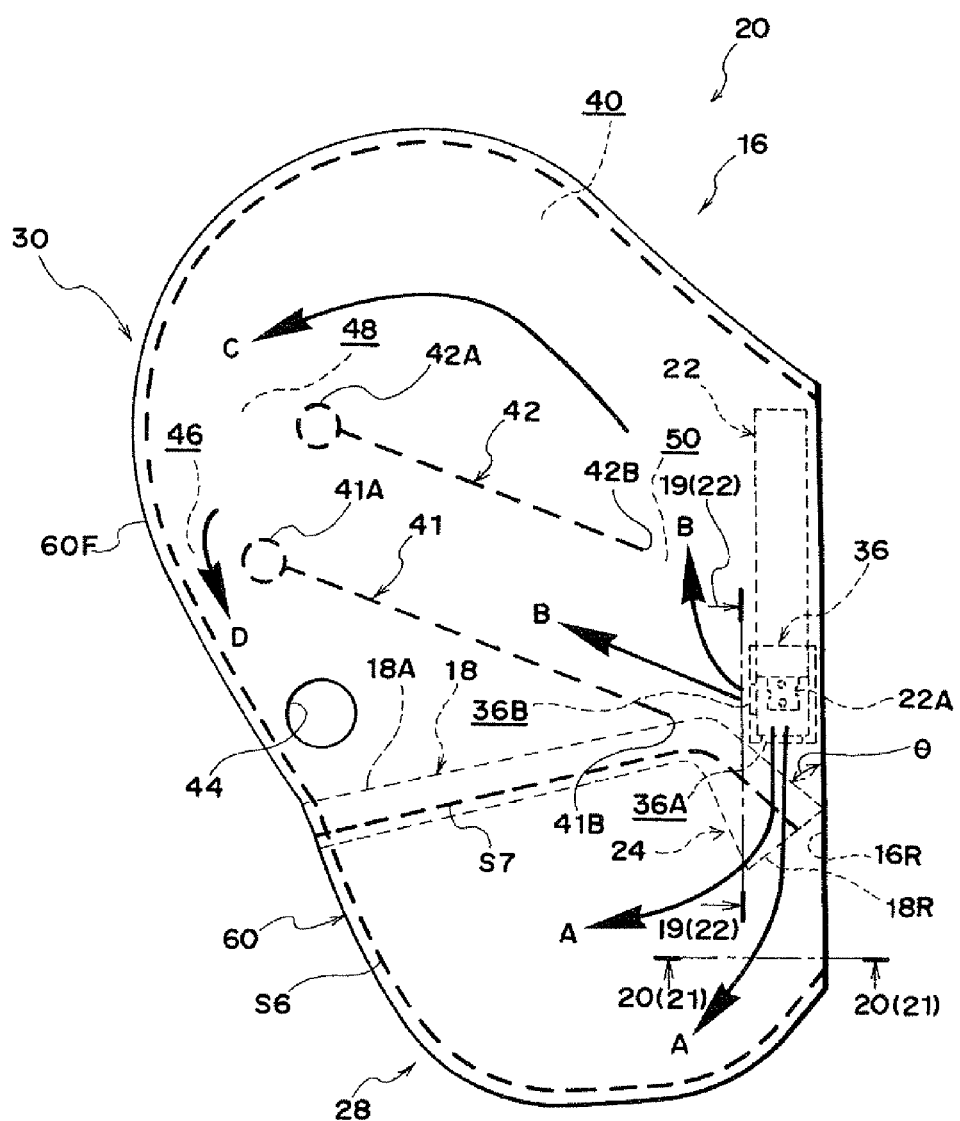
FIG. 18 to FIG. 22 relate to a second exemplary embodiment.

In FIG. 18, in the side airbag 16 in the inflated and expanded state of a side airbag device for a vehicle 20 relating to the present exemplary embodiment, the check valve 24 is constituted by a rear end portion 18R of the partition wall 18 and a rear side inner face 16R of the side airbag 16. A flow path for the gas is opened up by the rear end portion 18R of the partition wall 18 moving away from the rear side inner face 16R, and the flow path for the gas is closed off by the rear end portion 18R abutting against the rear side inner face 16R.

Figure 19:
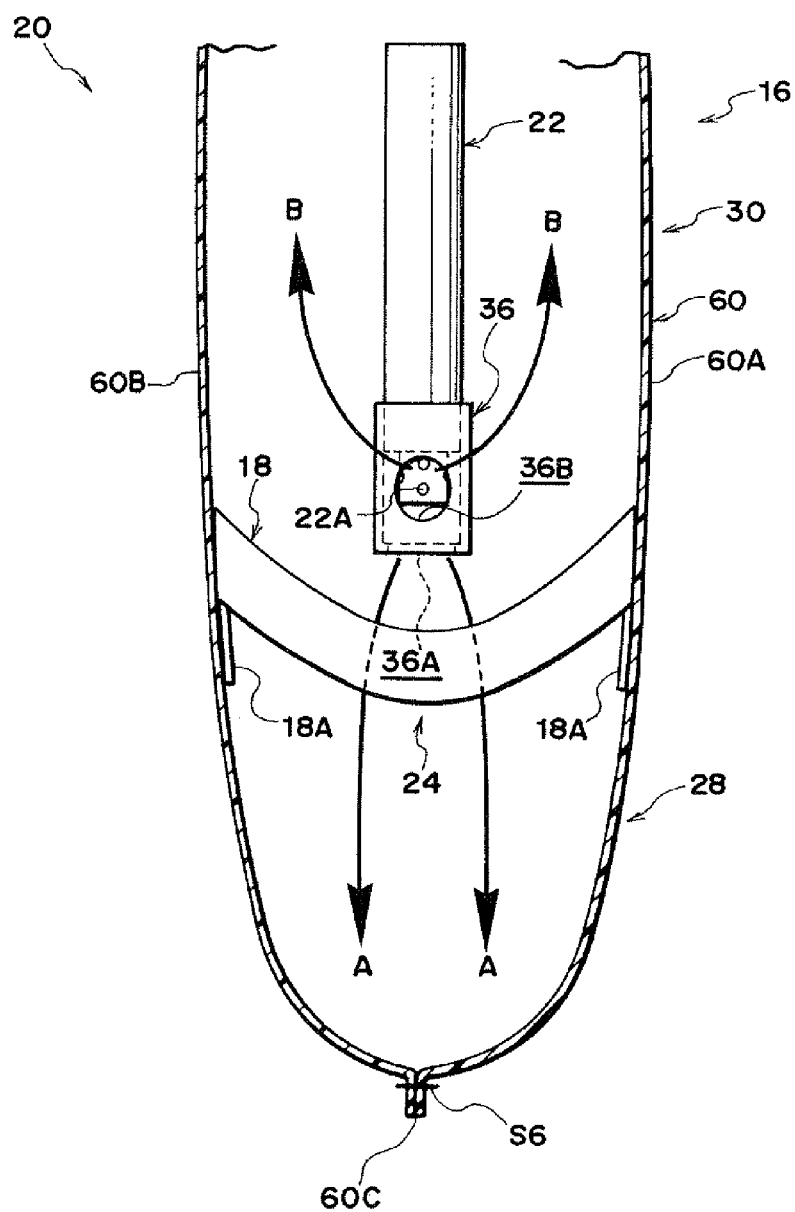

The present exemplary embodiment is formed by, for example, a single fabric 60 being folded in two to the seat forward side about a seat rearward end portion 60R and, as illustrated in FIG. 19, an outer side fabric 60A disposed at the seat width direction outer side and an inner side fabric 60B disposed at the seat width direction inner side being sewn together at a periphery edge portion 60C (a sewn portion S6). The partition wall 18 is structured as a separate member from the side airbag 16. The inner face of the fabric 60 of the side airbag 16 is sewn to edge portions 18A at the two seat width direction sides of the partition wall 18 (sewn portions S7).

At the check valve 24, slackness at the time of inflation and expansion of the side airbag 16 is set to be greater than the partition wall 18. Therefore, the check valve 24 protrudes to the seat downward side because of the pressure of the gas being supplied through the first aperture portion 36A of the diffuser 36 toward the lower chamber 28, is opened up by the rear end portion 18R of the partition wall 18 moving away from the rear side inner face 16R of the side airbag 16, and permits the flow of gas in the directions of the arrows A from the upper chamber 30 into the lower chamber 28. Then, when the discharge of gas from the inflator 22 is completed and the gas tries to flow back from the lower chamber 28 that is the high-pressure chamber to the upper chamber 30 that is the low-pressure chamber, the check valve 24 tries to invert to the seat upward side. At this time, the rear end portion 18R of the partition wall 18 makes surface contact with the rear side inner face 16R of the side airbag 16 and the check valve 24 closes.

As illustrated in FIG. 18, in the present exemplary embodiment, the edge portions 18A of the partition wall 18 are angled to the seat downward side toward the vehicle front to rear direction rear side in the region of the check valve 24, and angles θ formed between the edge portions 18A and the rear side inner face 16R of the side airbag 16 are set to, for example, less than 90°. Therefore, when the check valve 24 is closing, the rear end portion 18R of the partition wall 18 easily makes surface contact with the rear side inner face 16R.

Similarly to the first exemplary embodiment, the first seam 41 and the second seam 42 are provided at the portion of the fabric 60 that constitutes the upper chamber 30. The predetermined constriction gap 46 is provided between the seat forward side distal end portion 41A of the first seam 41 and a seat forward side periphery edge portion 60F of the fabric 60 of the upper chamber 30. The gap 48 is provided between the seat forward side distal end portion 42A of the second seam 42 and the seat forward side periphery edge portion 60F, and is specified to be larger than the predetermined constriction gap 46.

For the diffuser 36, the structures described in the above-mentioned first to fourth structural examples may be used as appropriate.

In the present exemplary embodiment, the side airbag 16 is formed by sewing the periphery edge portion 60C of the fabric 60, but this is not a limitation. For example, the side airbag 16 may be formed by hollow weaving.

Other portions are the same as in the first exemplary embodiment, so the same portions are assigned the same reference numerals in the drawings and are not described.

-Operation-

The present exemplary embodiment is constituted as described above, and operations thereof are described herebelow. In the side airbag device for a vehicle 20 relating to the present exemplary embodiment in FIG. 18, when the airbag ECU determines that a side collision is occurring on the basis of signals from the unillustrated collision sensor, the operation current is caused to flow from the airbag ECU to the inflator 22. The inflator 22 receives the operation current and operates, and a large quantity of gas is discharged through the gas discharge section 22A. This gas is supplied into the side airbag 16. Thus, the side airbag 16 inflates from the seatback 14, and inflates and expands between the vehicle side (not illustrated) and the occupant 26 (see FIG. 1).

Figure 20:
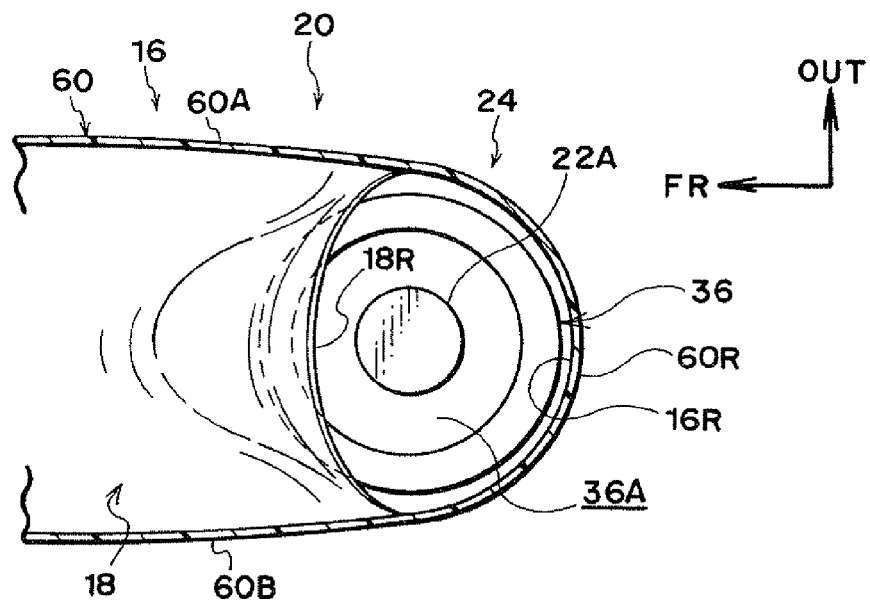

Here, as illustrated in FIG. 18 to FIG. 20, the check valve 24 opens so as to protrude to the lower side because of the pressure of the gas that passes through the first aperture portion 36A of the diffuser 36 and is supplied from the inflator 22 in the upper chamber 30 toward the lower chamber 28 in the directions of arrows A, and the check valve 24 permits the gas to flow into the lower chamber 28 in the directions of arrows A. Meanwhile, gas passes through the second aperture portion 36B of the diffuser 36 and is supplied in the directions of the arrows 13 into the upper chamber 30 too. Because the opening area of the first aperture portion 36A of the diffuser 36 is specified to be larger than the opening area of the second aperture portion 36B, the gas for inflation is supplied with precedence to the lower chamber 28 rather than the upper chamber 30. Therefore, the lower chamber 28 inflates and expands more promptly than the upper chamber 30 and has a higher pressure than the upper chamber 30. The inflation and expansion of the upper chamber 30 is the same as in the first exemplary embodiment, so is not described.

Figure 21:
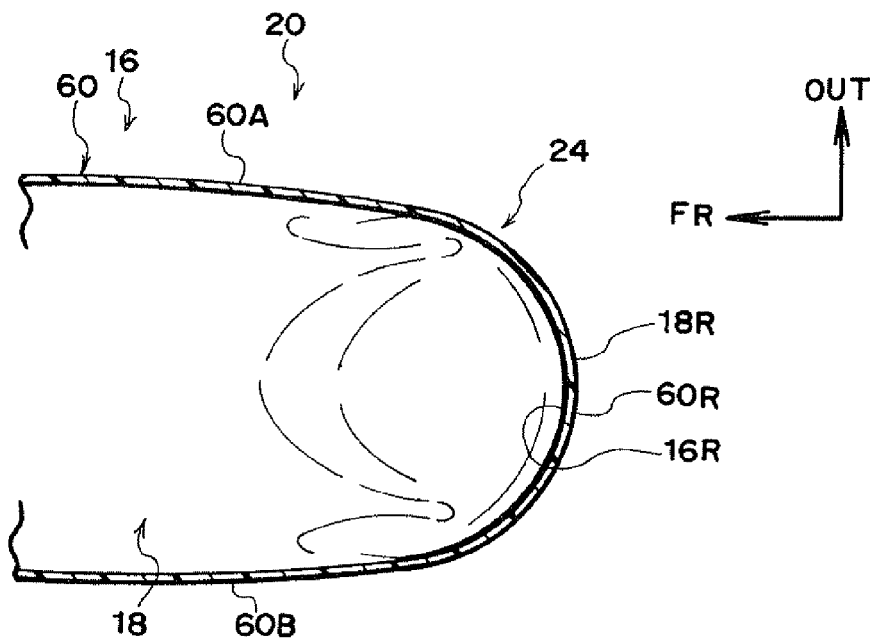
Figure 22:
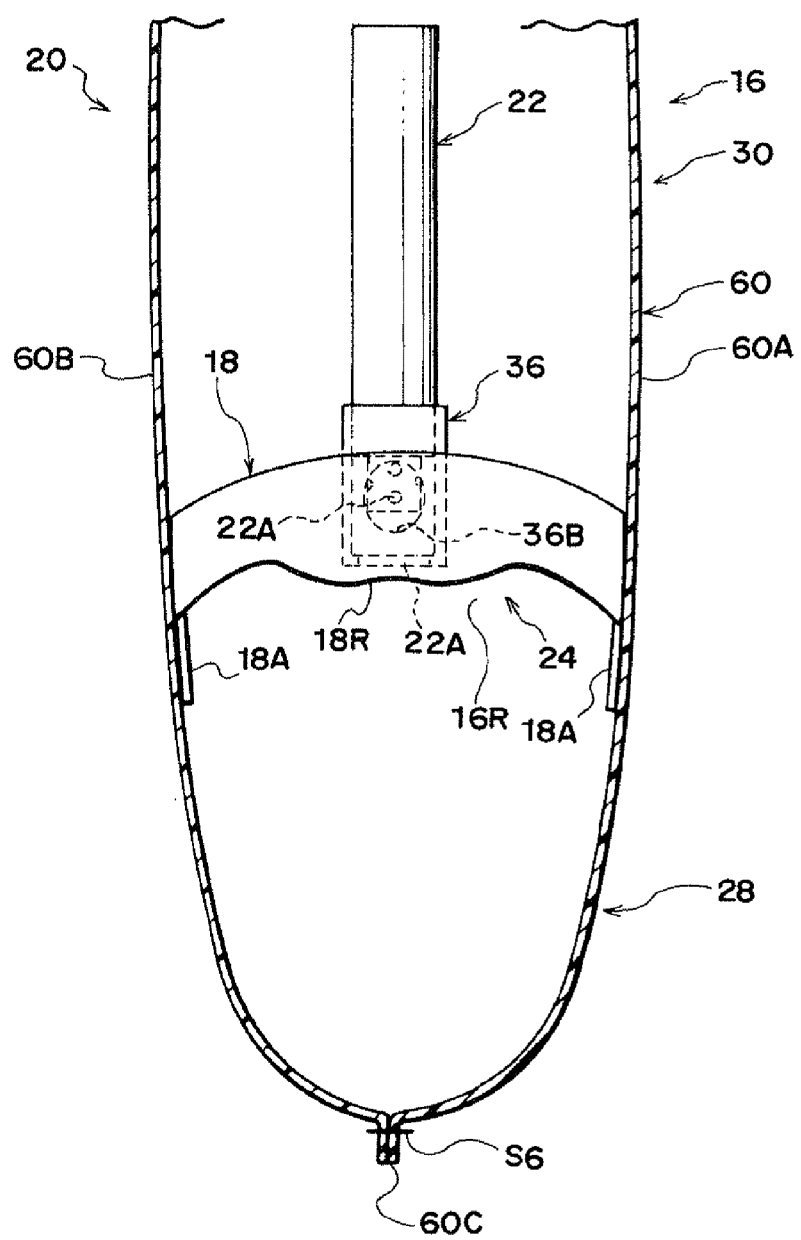

When the discharge of gas from the inflator 22 is completed, the gas tries to flow back from the lower chamber 28 that is the high-pressure chamber to the upper chamber 30 that is the low-pressure chamber. However, as illustrated in FIG. 21 and FIG. 22, the check valve 24 closes and the flow of gas is restricted. Therefore, the inner pressure of the lower chamber 28 may be maintained for a longer time. In particular, if the check valve 24 tries to invert to the seat upward side because of the gas flowing back, the rear end portion 18R of the partition wall 18 makes surface contact with the rear side inner face 16R of the side airbag 16, and thus the check valve 24 closes.

As illustrated in FIG. 18, in the present exemplary embodiment, the edge portions 18A of the partition wall 18 are angled to the seat downward side toward the vehicle front to rear direction rear side in the region of the check valve 24, and the angles θ formed between the edge portions 18A and the rear side inner face 16R of the side airbag 16 are set to, for example, less than 90°. Therefore, when the check valve 24 is closing, the rear end portion 18R of the partition wall 18 easily makes surface contact with the rear side inner face 16R. The check valve 24 is inhibited from inverting and opening to the seat upward side by the rear end portion 18R of the partition wall 18 making surface contact with the rear side inner face 16R. Therefore, the inner pressure of the lower chamber 28 that is the high-pressure chamber may be stably maintained.

Thus, in the present exemplary embodiment, the waist area 26W of the occupant 26 sitting on the vehicle seat 12 may be restrained promptly and with a high pressure by the lower chamber 28 that is the high-pressure chamber. Moreover, similarly to the first exemplary embodiment, respective portions of the upper body of the occupant 26 may be restrained with respectively appropriate restraining forces by the upper chamber 30 that is the low-pressure chamber.

In the exemplary embodiments described above, the first seam 41 and the second seam 42 are provided in the upper chamber 30 of the side airbag 16, but this is not a limitation. Structures are possible in which only the second seam 42 is not provided, and structures are possible in which neither of the first seam 41 and the second seam 42 is provided.

Explanation Of The Reference Numerals

10 Side airbag device for a vehicle
12 Vehicle seat
16 Side airbag
16R Rear side inner face
18 Partition wall
18A Edge portions
18R Rear end portion
20 Side airbag device for a vehicle
22 Inflator
22A Gas discharge section
24 Check valve
24D Lower end portion
26 Vehicle occupant
26C Chest area
26S Shoulder area
26W Waist area
28 Lower chamber (high-pressure chamber)
30 Upper chamber (low-pressure chamber)
32 Lower fabric
32A Outer side fabric
32B Inner side fabric
34 Upper fabric
34F Seat forward side periphery edge portion
34A Outer side fabric
34B Inner side fabric
36 Diffuser
36A First aperture portion
36B Second aperture portion
38 Middle chamber
40 Uppermost chamber
41 First seam (first bag thickness regulation portion)
41A Seat forward side distal end portion
42 Second seam (second bag thickness regulation portion)
44 Vent hole
46 Predetermined constriction gap
52 Reinforcement cloth
60 Fabric
60A Outer side fabric
60B Inner side fabric
60F Seat forward side periphery edge portion
θ Angle between the edge portion at each of the two seat width direction sides of the partition wall and the rear side inner face of the side airbag

The invention claimed is:

1. A side airbag device for a vehicle comprising:
a side airbag that includes a high-pressure chamber, which has a high pressure at a time of inflation and expansion, and a low-pressure chamber, which has a lower pressure than the high-pressure chamber, the high-pressure chamber and the low-pressure chamber each inflating and expanding at a time of side collision;
a partition wall that is disposed in the side airbag and partitions the high-pressure chamber from the low-pressure chamber;
an inflator that is disposed in the low-pressure chamber in a state in which a gas discharge section faces the high-pressure chamber and is disposed at the low-pressure chamber side relative to the partition wall, that supplies gas for inflation mainly toward the high-pressure chamber and that also supplies the gas for inflation to the low-pressure chamber; and
a check valve that is disposed at the partition wall, that permits the gas discharged from the gas discharge section of the inflator to flow from the low-pressure chamber to the high-pressure chamber, and that restricts a flow of the gas in the opposite direction;
wherein:
in the side airbag in an inflated and expanded state:
the inflator is disposed in the side airbag at a rear side with respect to a vehicle seat in a front-to-rear direction of the vehicle, the partition wall is disposed at a position that corresponds with an abdomen area of an occupant sitting on the vehicle seat, the high-pressure chamber is a lower chamber that corresponds with a waist area of the occupant, and the low-pressure chamber is an upper chamber that corresponds with at least one of a chest area or a shoulder area of the occupant, and the partition wall is formed by sewing together, of an upper fabric that constitutes the upper chamber, a lower edge of an outer side fabric that is disposed at an outer side with respect to the vehicle seat in a seat-width direction and a lower edge of an inner side fabric that is disposed at an inner side in a seat-width direction, and the check valve is disposed at a rear side in the side airbag in a front-to-rear direction of the vehicle, and is formed by extending the upper fabric to a seat downward side.

2. The side airbag device for a vehicle according to claim 1, wherein a reinforcement cloth is superposed on and sewn to the check valve.

3. The side airbag device for a vehicle according to claim 1, wherein a lower end portion of the check valve is at least partially sewn to a lower fabric that constitutes the lower chamber.

4. The side airbag device for a vehicle according to claim 1, wherein a diffuser is disposed at the gas discharge section of the inflator, the diffuser comprising a first aperture portion that opens toward the lower chamber and a second aperture portion that opens toward the upper chamber are provided, the diffuser regulating flows of the gas such that the gas discharged from the gas discharge section mainly flows toward the lower chamber and is also distributed to the upper chamber.

5. The side airbag device for a vehicle according to claim 4 wherein, in the upper chamber, a first bag thickness regulation portion is provided extending to the seat forward side and diagonally upward from the diffuser side, at which first bag thickness regulation portion, of an upper fabric that constitutes the upper chamber, an outer side fabric that is disposed at the seat width direction outer side with respect to the vehicle seat is sewn to an inner side fabric disposed at the seat width direction inner side, the first bag thickness regulation portion partitioning the upper chamber into a middle chamber at the seat lower side thereof and an uppermost chamber at the seat upper side thereof, the diffuser is set such that the gas discharged from the second aperture portion of the diffuser is supplied to the uppermost chamber and supplied through a predetermined constriction gap to the middle chamber, the predetermined constriction gap being provided between a seat forward side distal end portion of the first bag thickness regulation portion and a seat forward side periphery edge portion of the upper chamber, and an inner pressure of the middle chamber at the time of inflation and expansion of the side airbag is set to a lower pressure than an inner pressure of the uppermost chamber.

6. The side airbag device for a vehicle according to claim 5, wherein a second bag thickness regulation portion is provided in the upper chamber, extending to the seat forward side and diagonally upward from the diffuser side, at the seat upper side of the first bag thickness regulation portion with a predetermined spacing from the first bag thickness regulation portion, at which second bag thickness regulation portion the outer side fabric is sewn to the inner side fabric.

7. The side airbag device for a vehicle according to claim 5, wherein a vent hole is formed in a portion of the upper fabric that constitutes the middle chamber.

\* \* \* \* \*